US012602783B2

(12) United States Patent
Anand et al.

(10) Patent No.: US 12,602,783 B2
(45) Date of Patent: Apr. 14, 2026

(54) SYSTEM AND METHODS FOR AUTOMATIC IMAGE ALIGNMENT OF THREE-DIMENSIONAL IMAGE

(71) Applicant: GE Precision Healthcare LLC, Waukesha, WI (US)

(72) Inventors: Deepa Anand, Bengaluru (IN); Bipul Das, Bengaluru (IN); Vanika Singhal, Bengaluru (IN); Rakesh Mullick, Bengaluru (IN); Sandeep Dutta, Waukesha, WI (US); Amy L Deubig, Waukesha, WI (US); Maud Bonnard, Waukesha, WI (US); Christine Smith, Waukesha, WI (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 395 days.

(21) Appl. No.: 18/453,954

(22) Filed: Aug. 22, 2023

(65) Prior Publication Data

US 2025/0069218 A1 Feb. 27, 2025

(51) Int. Cl.
G06K 9/00 (2022.01)
G06T 7/00 (2017.01)
(Continued)

(52) U.S. Cl.
CPC .............. G06T 7/0012 (2013.01); G06T 7/60 (2013.01); G06T 15/00 (2013.01); G06V 10/24 (2022.01);
(Continued)

(58) Field of Classification Search
CPC .............. G06K 9/00; G06T 7/00; A61B 34/25
(Continued)

(56) References Cited

U.S. PATENT DOCUMENTS 9,495,752 B2  11/2016  Wu et al.
9,542,741 B2 *  1/2017  Birkbeck .............. G06T 7/0012
(Continued)

FOREIGN PATENT DOCUMENTS

JP       2020171687 A   10/2020
JP       2022500148 A    1/2022
WO       2022123577 A1   6/2022

OTHER PUBLICATIONS

Automated measurement of hip-knee-ankle angle on the unilateral lower limb X-rays using deep learning Yu n Pei #[1], Wen zhuo Yang #[23], Shangqing Wei [4], Rui Cai [3], Jiaein Li [3], (Year: 2020).*

(Continued)

*Primary Examiner* — Seyed H Azarian
(74) *Attorney, Agent, or Firm* — McCoy Russell LLP

(57) ABSTRACT

The current disclosure provides systems and methods for automatic image alignment of three-dimensional (3D) medical image volumes. The method includes pre-processing the 3D medical image volume by selecting a sub-volume of interest, detecting anatomical landmarks in the sub-volume using a deep neural network, estimating transformation parameters based on the anatomical landmarks to adjust rotation angles and translation of the sub-volume, adjusting the rotation angles and translation to produce a first aligned sub-volume, determining confidence in the transformation parameters based on the first aligned sub-volume, and iteratively refining the transformation parameters if the confidence is below a predetermined threshold. The disclosed approach for automated image alignment reduces the need for manual alignment and, increases a probability of the 3D image volume converging to a desired orientation compared to conventional approaches.

19 Claims, 8 Drawing Sheets

(51) Int. Cl.
| | |
|---|---|
| *G06T 7/60* | (2017.01) |
| *G06T 15/00* | (2011.01) |
| *G06V 10/24* | (2022.01) |
| *G06V 10/44* | (2022.01) |

(52) U.S. Cl.
CPC .... *G06V 10/44* (2022.01); *G06T 2207/20084* (2013.01); *G06T 2207/20132* (2013.01); *G06V 2201/03* (2022.01)

(58) Field of Classification Search
USPC ....... 382/100, 103, 106, 128–133, 154, 156, 382/168, 173, 181, 189, 199, 214, 224, 382/254, 285–291, 305; 378/4, 21
See application file for complete search history.

(56) References Cited

U.S. PATENT DOCUMENTS

| | | | | |
|---|---|---|---|---|
| 10,438,350 | B2 * | 10/2019 | Patil | G06T 7/0012 |
| 10,912,571 | B2 * | 2/2021 | Pavlovskaia | A61B 34/10 |
| 12,076,158 | B2 * | 9/2024 | Geiger | A61B 5/7475 |
| 12,383,334 | B2 * | 8/2025 | Chaoui | A61B 34/25 |
| 2020/0327661 | A1 | 10/2020 | Oved | |
| 2021/0177522 | A1 | 6/2021 | Boddington | |
| 2021/0201476 | A1 * | 7/2021 | Prasad | G06T 7/50 |
| 2021/0307711 | A1 * | 10/2021 | Vancamberg | A61B 6/502 |

OTHER PUBLICATIONS

Cheng Yuan et al: "Plane-Fitting Robust Registration for Complex 3D Models", Jan. 1, 2025, Springer International Publishing; p. 640-651, XP047645370.

Dou Haoran et al: "Agent with Warm Start and Active Termination for Plane Localization in 3D Ultrasound", pp. 290-298, XP047526581.

EP application 24192588.2 filed Aug. 2, 2024—extended Search Report issued Feb. 10, 2025; 13 pages.

Zheng G et al: "HipMatch: An object-oriented cross-platform program for accurate determination of cup orientation using 2D-3D registration of single standard X-ray radiograph and a CT volume" Computer Methods and Programs in Biomedicine; Elsevier; Amsterdam; NL; vol. 95, n. 3, pp. 236-248, XPO.

"Deep Learning Multi-Planar Reformatting of Medical Images," GE Healthcare, Available as Early as May 24, 2023, 79 pages.

"Explainable Confidence Estimation for Landmark Localization," GE Healthcare, Available as Early as May 24, 2023, 103 pages.

Scherer, T. et al., "Comparison of knee joint orientation in clinically versus biomechanically aligned computed tomography coordinate system," Journal of Orthopaedic Translation, vol. 16, Jan. 2019, 7 pages.

Pei, Y. et al., "Automated measurement of hip-knee-ankle angle on the unilateral lower limb X-rays using deep learning," Physical and Engineering Sciences in Medicine, vol. 44, No. 1, Mar. 2021, Available Online Nov. 30, 2020, 10 pages.

JP application 2024-124610 filed Jul. 31, 2024—Office Action issued Oct. 8, 2025; Machine Translation, 5 pages.

* cited by examiner

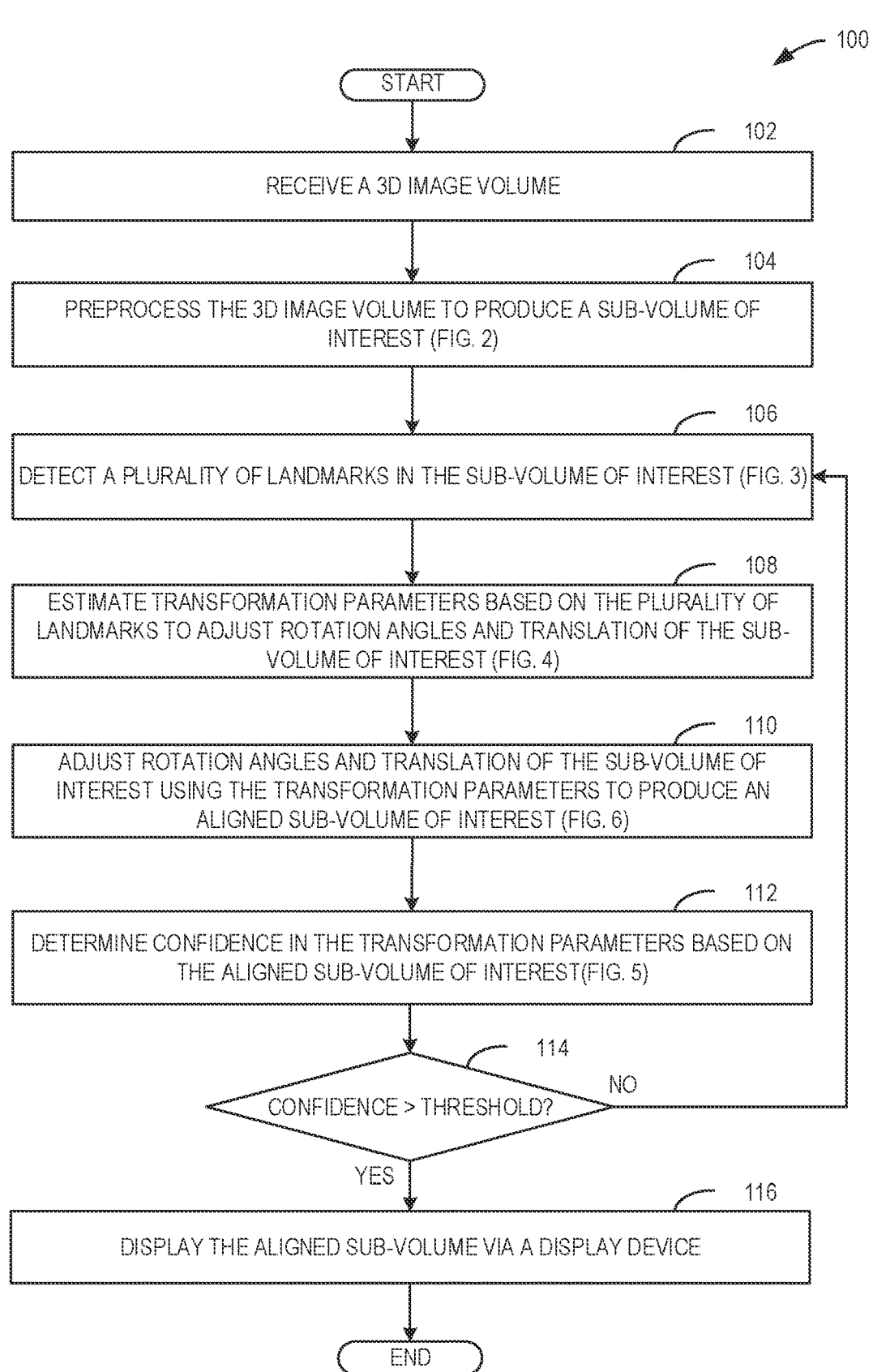

100

START

102
RECEIVE A 3D IMAGE VOLUME

104
PREPROCESS THE 3D IMAGE VOLUME TO PRODUCE A SUB-VOLUME OF INTEREST (FIG. 2)

106
DETECT A PLURALITY OF LANDMARKS IN THE SUB-VOLUME OF INTEREST (FIG. 3)

108
ESTIMATE TRANSFORMATION PARAMETERS BASED ON THE PLURALITY OF LANDMARKS TO ADJUST ROTATION ANGLES AND TRANSLATION OF THE SUB-VOLUME OF INTEREST (FIG. 4)

110
ADJUST ROTATION ANGLES AND TRANSLATION OF THE SUB-VOLUME OF INTEREST USING THE TRANSFORMATION PARAMETERS TO PRODUCE AN ALIGNED SUB-VOLUME OF INTEREST (FIG. 6)

112
DETERMINE CONFIDENCE IN THE TRANSFORMATION PARAMETERS BASED ON THE ALIGNED SUB-VOLUME OF INTEREST(FIG. 5)

114
CONFIDENCE > THRESHOLD?    NO

YES

116
DISPLAY THE ALIGNED SUB-VOLUME VIA A DISPLAY DEVICE

END

FIG. 1

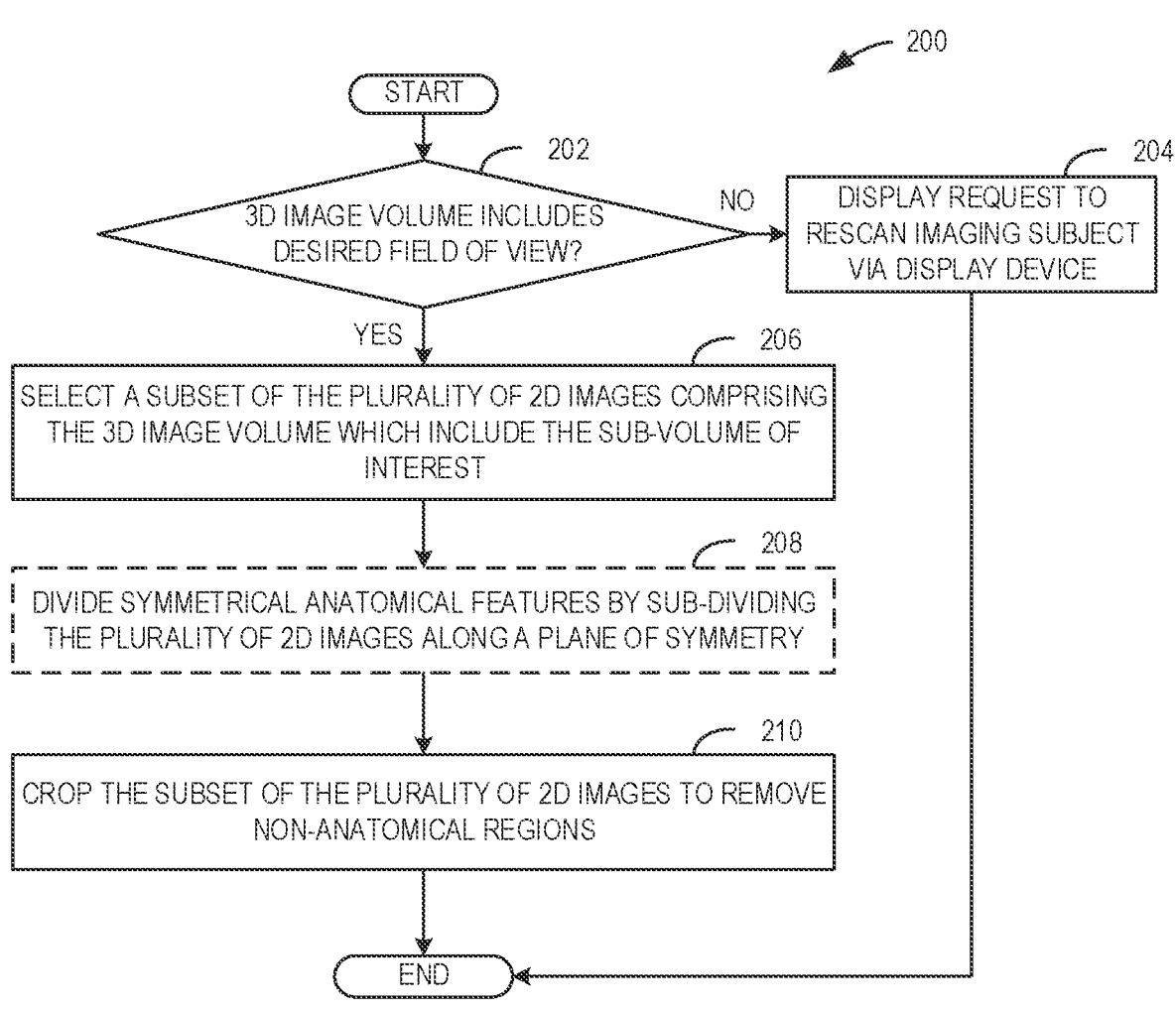

200

START

202

3D IMAGE VOLUME INCLUDES
DESIRED FIELD OF VIEW?

NO

204

DISPLAY REQUEST TO
RESCAN IMAGING SUBJECT
VIA DISPLAY DEVICE

YES

206

SELECT A SUBSET OF THE PLURALITY OF 2D IMAGES COMPRISING
THE 3D IMAGE VOLUME WHICH INCLUDE THE SUB-VOLUME OF
INTEREST

208

DIVIDE SYMMETRICAL ANATOMICAL FEATURES BY SUB-DIVIDING
THE PLURALITY OF 2D IMAGES ALONG A PLANE OF SYMMETRY

210

CROP THE SUBSET OF THE PLURALITY OF 2D IMAGES TO REMOVE
NON-ANATOMICAL REGIONS

END

START

302

MAP THE SUB-VOLUME OF INTEREST TO A PLURALITY OF LANDMARKS USING A TRAINED DEEP NEURAL NETWORK

304

DERIVE ONE OR MORE LANDMARKS BASED ON THE POSITIONS OF THE PLURALITY OF LANDMARKS

306

DETERMINE CONFIDENCE FOR EACH OF THE DETECTED LANDMARKS

308

FILTER THE PLURALITY OF LANDMARKS BASED ON CONFIDENCE, TO OBTAIN AT LEAST THREE LANDMARKS IN THE SUB-VOLUME

END

START

400

402

DETERMINE AN ANATOMICAL PLANE OF INTEREST WITH RESPECT TO AN IMAGE COORDINATE SYSTEM BASED ON THE PLURALITY OF LANRMARKS, WHEREIN THE ANATOMICAL PLANE OF INTEREST INTERSECTS THE SUB-VOLUME

404

DETERMINE A ROTATION ANGLE AND TRANSLATION VECTOR FOR THE ANATOMICAL PLANE OF INTEREST

END

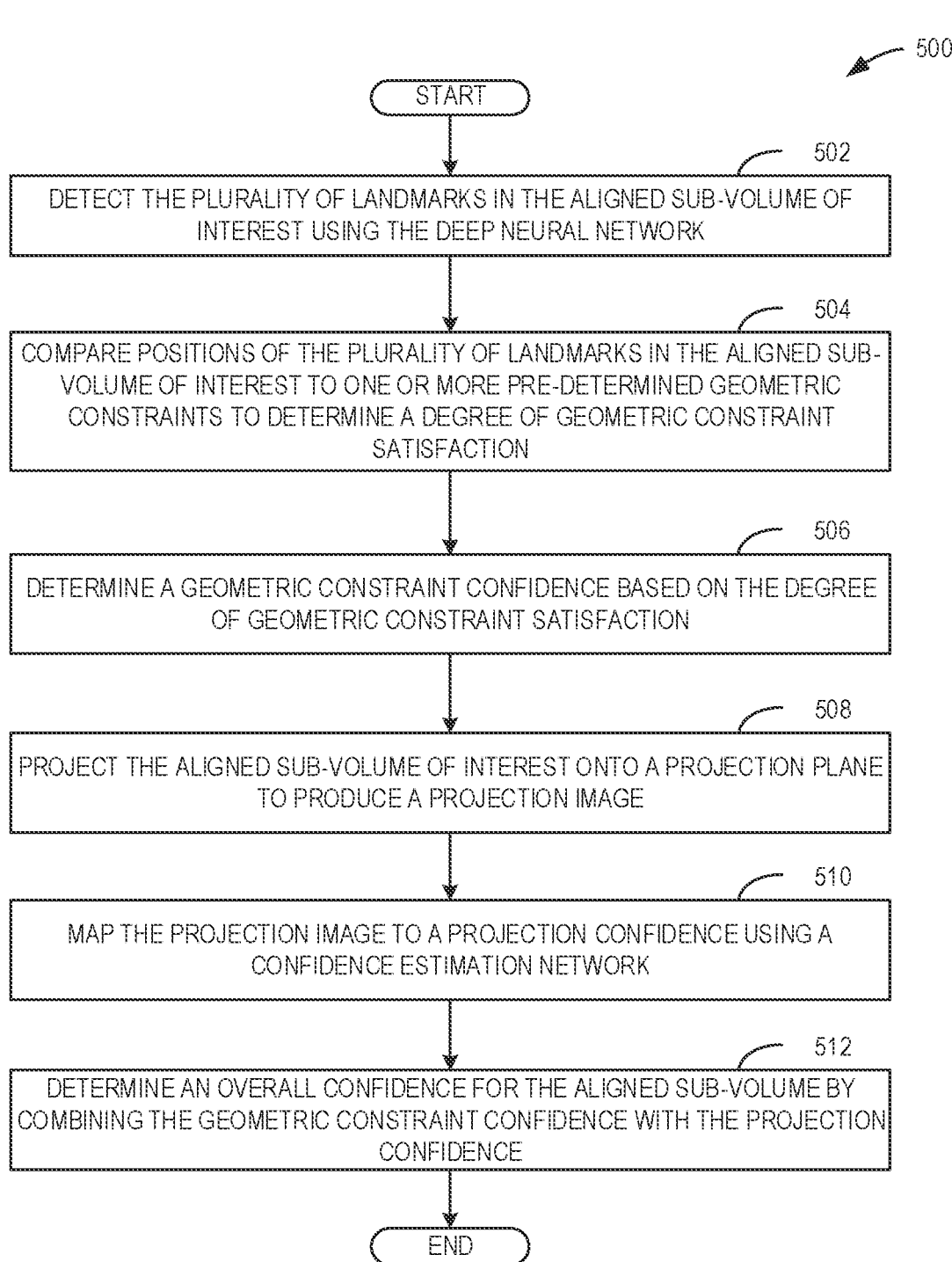

500

START

502
DETECT THE PLURALITY OF LANDMARKS IN THE ALIGNED SUB-VOLUME OF INTEREST USING THE DEEP NEURAL NETWORK

504
COMPARE POSITIONS OF THE PLURALITY OF LANDMARKS IN THE ALIGNED SUB-VOLUME OF INTEREST TO ONE OR MORE PRE-DETERMINED GEOMETRIC CONSTRAINTS TO DETERMINE A DEGREE OF GEOMETRIC CONSTRAINT SATISFACTION

506
DETERMINE A GEOMETRIC CONSTRAINT CONFIDENCE BASED ON THE DEGREE OF GEOMETRIC CONSTRAINT SATISFACTION

508
PROJECT THE ALIGNED SUB-VOLUME OF INTEREST ONTO A PROJECTION PLANE TO PRODUCE A PROJECTION IMAGE

510
MAP THE PROJECTION IMAGE TO A PROJECTION CONFIDENCE USING A CONFIDENCE ESTIMATION NETWORK

512
DETERMINE AN OVERALL CONFIDENCE FOR THE ALIGNED SUB-VOLUME BY COMBINING THE GEOMETRIC CONSTRAINT CONFIDENCE WITH THE PROJECTION CONFIDENCE

END

FIG. 5

SYSTEM AND METHODS FOR AUTOMATIC IMAGE ALIGNMENT OF THREE-DIMENSIONAL IMAGE

FIELD

Embodiments of the subject matter disclosed herein relate to medical imaging, and more particularly, to multiplanar reformation of three-dimensional medical images.

BACKGROUND

Three-dimensional (3D) medical imaging is a type of medical imaging technology that acquires imaging data for a volume of an imaging subject, as opposed to a single projection or two-dimensional (2D) slice of the imaging subject. 3D medical images may be acquired using a variety of imaging modalities, including computed tomography (CT), magnetic resonance imaging (MRI), and ultrasound. The 3D medical image data comprises a series of cross-sectional images, which may be combined to create a 3D representation of the patient's anatomy for use in diagnosis or treatment of various medical conditions. The series of cross-sectional images may comprise a sequence of images parallel to a first plane, where the first plane may be one of a set of pre-determined planes, such as axial, coronal, or sagittal, or the first plane may be dynamically determined to capture an anatomical region of interest in a desired orientation (e.g., scan plane planning which may be performed using 2D localizer images). However, the series of cross-sectional images may not capture the anatomical region(s) of interest in the desired orientation(s). For example, if a plane defining a desired view of an anatomy of interest is not parallel to the first plane, the series of cross-sectional images may not include an image capturing the anatomy of interest in the desired orientation. In such cases, re-alignment/reformatting of the 3D medical imaging data to "synthesize" a view of the anatomy of interest in the desired orientation may be performed.

In some embodiments, the 3D medical imaging data may be re-aligned by performing multiplanar reformation (MPR) of the series of cross-sectional images along a second plane, where the second plane may be selected by a technician or radiologist. By orienting anatomical features captured by a 3D medical image to match one or more standard orientations, a more consistent and accurate interpretation of the medical image, and subsequent diagnosis, may be made. Alignment of images is typically done by manually adjusting the position of the images (e.g., by selecting the second plane/plane of interest along which to reformat the series of cross-sectional images) until they are in the desired orientation. This process is often done by a technician or radiologist, who must carefully adjust the images until they are properly aligned. However, manual alignment of images is a tedious and time-consuming process, often taking up to three minutes per image. Furthermore, manual alignment is prone to errors, especially when performed by a novice technician. Inaccurate alignment of images may lead to misinterpretation of the imaging data, resulting in incorrect diagnoses and treatments. Therefore, there is a need for a more efficient and accurate method of image alignment.

BRIEF DESCRIPTION

In one embodiment, a method for automatically aligning a 3D medical image volume to show a pre-determined view of interest in a pre-determined orientation includes, preprocessing the 3D medical image volume by selecting a sub-volume of interest, detecting a plurality of anatomical landmarks in the sub-volume of interest using a deep neural network trained to identify anatomical landmarks, estimating transformation parameters based on the plurality of anatomical landmarks to adjust rotation angles and translation of the sub-volume of interest, adjusting rotation angles and translation of the sub-volume of interest using the transformation parameters to produce a first aligned sub-volume of interest, determining confidence in the transformation parameters based on the first aligned sub-volume of interest, and refining the transformation parameters iteratively if the confidence is below a predetermined threshold.

In another embodiment, an image processing system, comprises a display device, a non-transitory memory including instructions, and a processor, wherein, when executing the instructions, the processor causes the image processing system to receive a 3D image volume, pre-process the 3D image volume by selecting a sub-volume of interest, detect a plurality of landmarks in the sub-volume of interest using a deep neural network trained to identify anatomical landmarks, estimate transformation parameters based on the plurality of landmarks to adjust rotation angles and translation of the sub-volume of interest, adjust rotation angles and translation of the sub-volume of interest using the transformation parameters to produce a first aligned sub-volume of interest, determine confidence in the transformation parameters based on the first aligned sub-volume of interest, and refine the transformation parameters iteratively if the confidence is below a predetermined threshold.

In another embodiment, a method includes receiving a 3D image volume comprising a first plurality of 2D images parallel to a first plane, pre-processing the 3D image volume by selecting a subset of the first plurality of 2D images to produce a sub-volume of interest including an anatomical region of interest, detecting at least three landmarks in the sub-volume of interest using a deep neural network trained to identify anatomical landmarks, estimating transformation parameters, including an anatomical plane of interest intersecting the sub-volume of interest, based on the at least three landmarks, performing multiplanar reformatting of the sub-volume of interest along the anatomical plane of interest to produce a first aligned sub-volume of interest, wherein the first aligned sub-volume of interest comprises a second plurality of 2D images parallel to the anatomical plane of interest, determining confidence in the transformation parameters based on the first aligned sub-volume of interest, and refining the transformation parameters iteratively if the confidence is below a predetermined threshold.

In this way, a 3D medical image volume may be automatically aligned to show an anatomical region of interest in a standard orientation, without requiring time-consuming manual alignment. Further, by iteratively refining the transformation parameters to improve alignment if the confidence is below a predetermined threshold, a likelihood of successful alignment is increased, as the inventors herein have discovered that a likelihood of a 3D image volume converging to a desired orientation is increased the closer the initial orientation of the 3D image volume is to the desired orientation.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1 is a flowchart illustrating a method 100 for automatic alignment of a 3D image volume, according to an embodiment of the current disclosure;

FIG. 2 is a flowchart illustrating a method 200 for preprocessing a 3D image volume to produce a sub-volume of interest, according an embodiment of the current disclosure;

FIG. 5 is a flowchart illustrating a method 500 for determining confidence in the alignment of a sub-volume of interest, according to an embodiment of the current disclosure;

DETAILED DESCRIPTION

Figure 3:
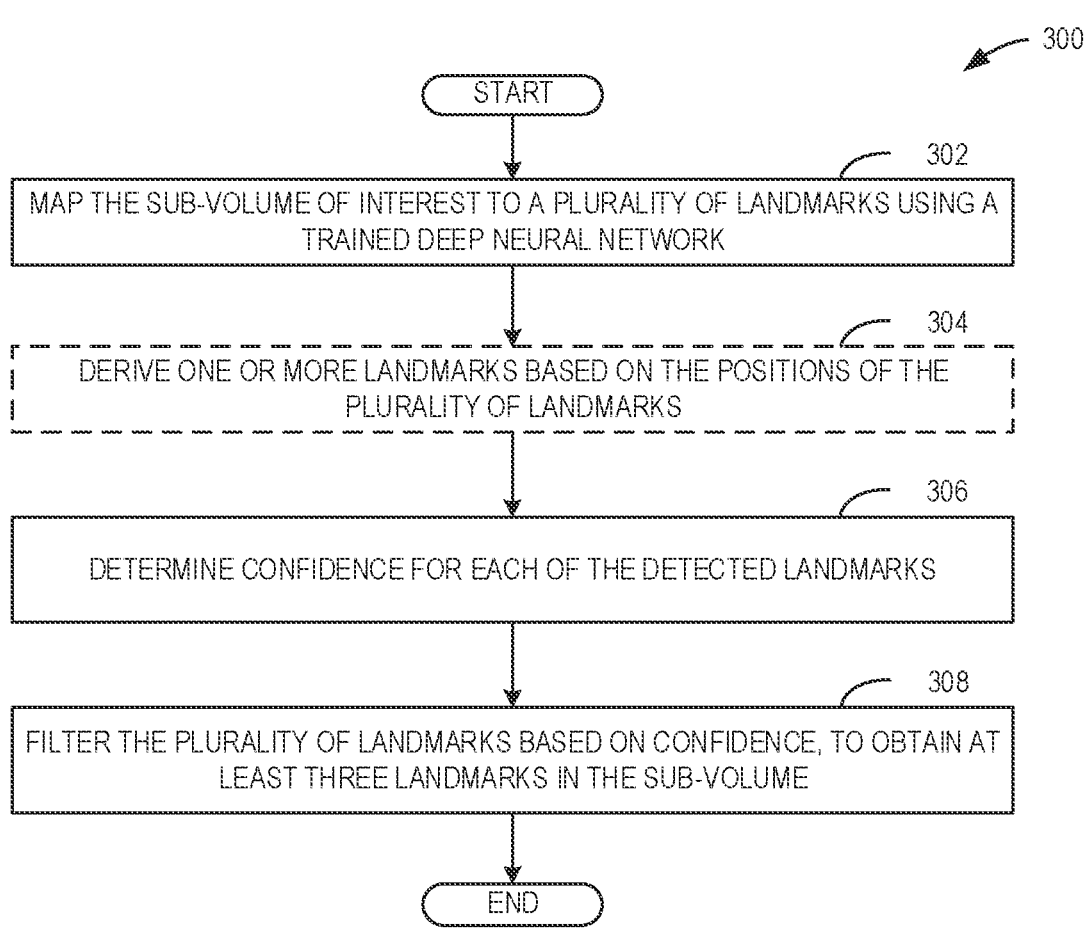
FIG. 3 is a flowchart illustrating a method 300 for detecting landmarks in a sub-volume of interest, according to an embodiment of the current disclosure.

The following description relates to various methods and systems for automatically aligning 3D image volumes to capture anatomical features of interest in standard planes and orientations, bypassing the need for manual image alignment which may be time consuming and inconsistent. In some embodiments, the automatic image alignment may include four aspects, preprocessing, landmark detection, alignment correction, and alignment confidence estimation, where the preprocessing may validate if an acquired 3D image volume is suitable for alignment, landmark detection identifies anatomical reference points for alignment, alignment correction aligns the 3D image volume to desired planes at desired orientations, and alignment confidence estimation estimates the accuracy of the automatic alignment process, and my invoke an iterative alignment adjustment process if a confidence threshold is not satisfied.

In one aspect, a 3D image volume is preprocessed to determine if a desired field of view (FOV) is included in the 3D image volume. A sub-volume of interest, including the desired field of view, may be segmented out of the 3D image volume by identifying 2D image slices of the 3D image volume which include the anatomical features of interest. Additionally, the preprocessing may include a laterality separator step to separate left and right anatomical structures for separate processing.

In another aspect, landmarks in the sub-volume may be detected using a deep neural network trained to segment anatomical landmarks, where landmarks may comprise points, 3D cylindrical structures, or anatomical structures. The landmarks detected in the sub-volume are based on predefined anatomical landmarks associated with the desired planes of view.

In another aspect, the detected landmarks may be filtered by confidence, where confidence in detected landmarks may be based on the features (e.g., shape and appearance) of the detected landmarks. In one embodiment, a feature distribution for each landmark type is created, and the confidence of the landmarks detected in the sub-volume is determined by calculating a probability of the landmark, as encoded by its features, belonging to the feature distribution of its respective landmark type. The filtered landmarks (e.g., the three or more most confident landmarks) may be used to determine an anatomical plane of interest with respect to the image coordinate system, and further a rotation angle and translation vector for the anatomical plane of interest may be determined by comparing the positions of the filtered landmarks against one or more pre-determined geometric constraints. The anatomical plane of interest, together with the rotation angle and translation vector may be collectively referred to herein as transformation parameters. The 3D image volume may then be reformatted using a technique such as multiplanar reformatting (MPR), based on the transformation parameters, to produce an aligned sub-volume.

In another aspect, confidence in the transformation parameters used to produce the aligned sub-volume may be determined based on a degree of satisfaction of geometric constraints by the landmarks in the aligned sub-volume, and further based on a projection-based confidence. In one embodiment, Maximum Intensity Projections (MIPs) are generated from the aligned sub-volume, and a machine learning/deep learning network is used to classify whether the aligned sub-volume is within a pre-decided tolerance limit of rotation from the desired orientation. If the confidence is below a threshold, the alignment workflow may be repeated for a pre-determined number of iterations. If the confidence remains below the threshold after the pre-determined number of iterations, an alignment failure may be declared.

Figure 6:
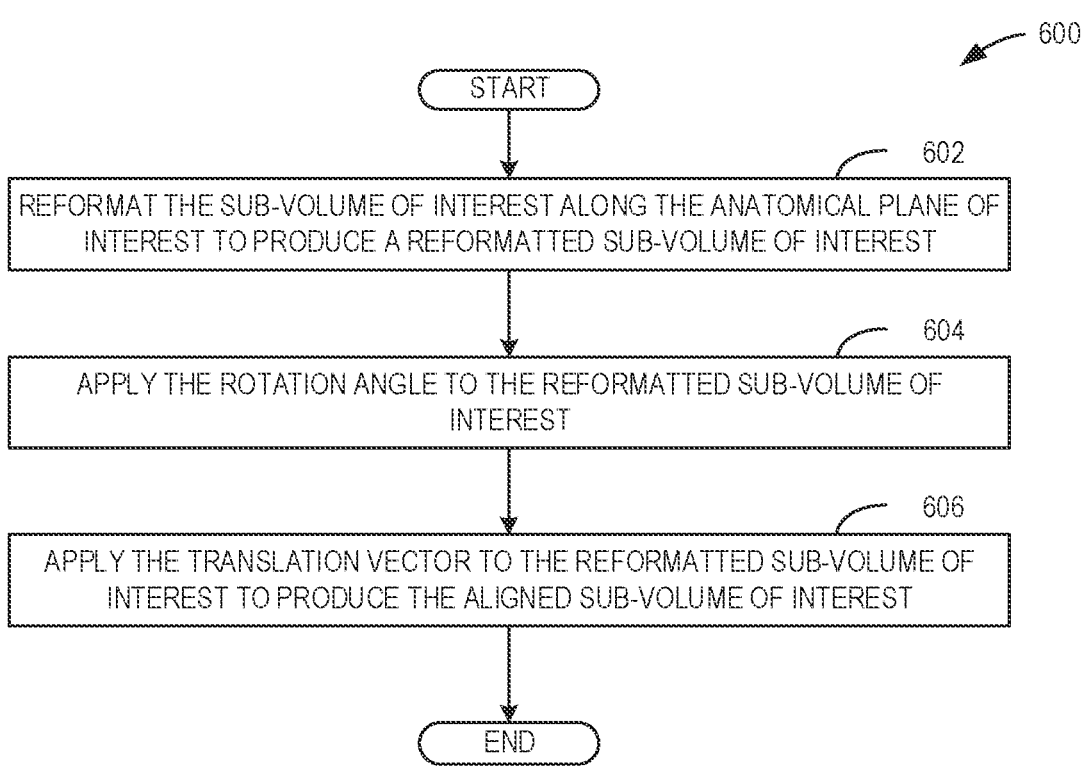
FIG. 6 is a flowchart illustrating a method 600 for adjusting rotation angles and translation of a sub-volume of interest using transformation parameters, according to an embodiment of the current disclosure.
Figure 7:
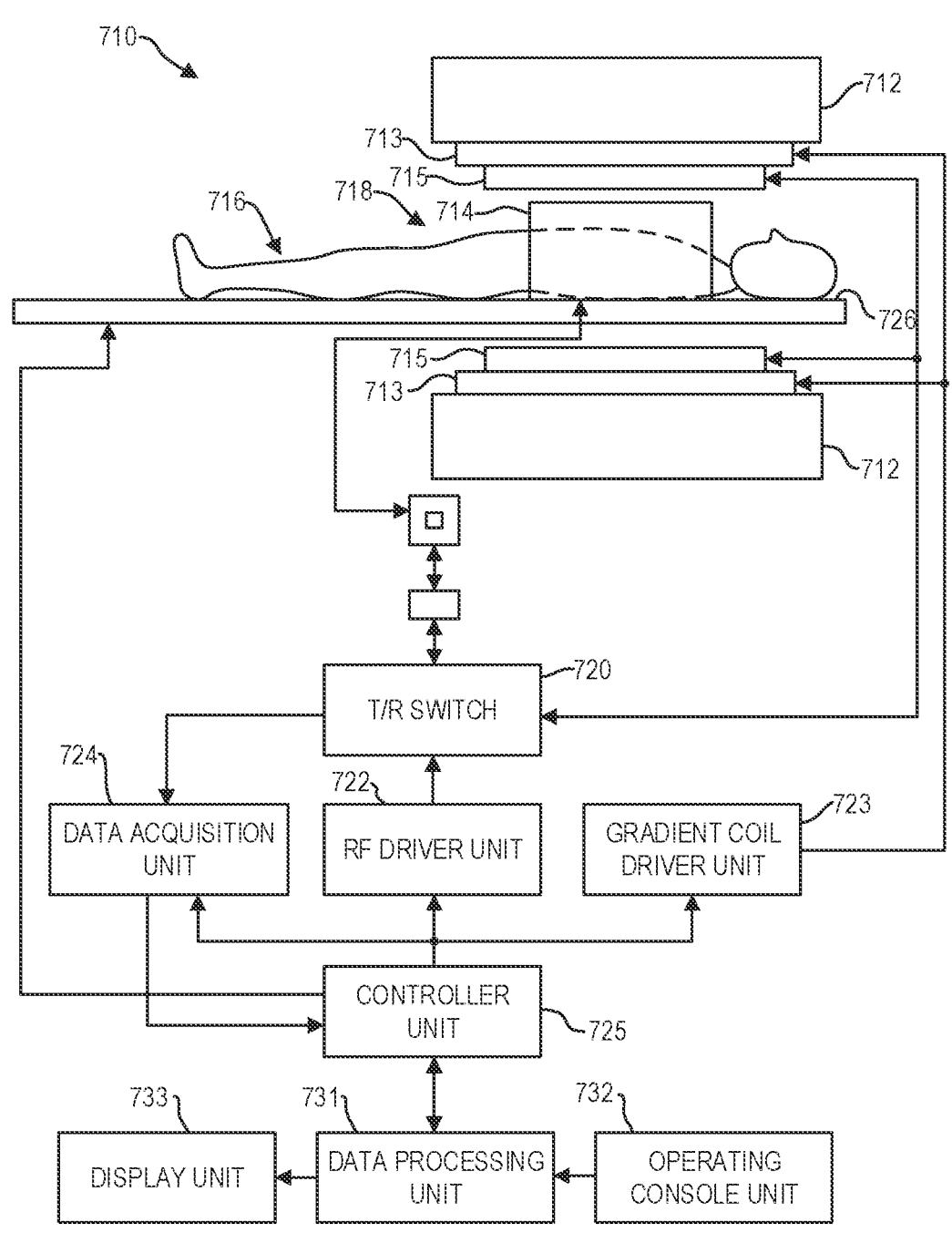
FIG. 7 is a block diagram of an MRI system, according to an embodiment of the disclosure.

In one embodiment, a 3D medical image (also referred to herein as a 3D image, 3D medical imaging volume, and related terms), may be acquired via an imaging device, such as the MRI apparatus 710 shown in FIG. 7. The 3D medical image volume acquired by the imaging device may be automatically aligned to produce one or more standard views of one or more anatomical regions of interest using an image processing system 802, shown in FIG. 8. The image processing system 802 may execute one or more operations of an automatic image alignment method, such as method 100, shown in FIG. 1, which includes performing one or more preprocessing operations (as described be method 200, shown in FIG. 2) to obtain an a sub-volume of interest, detecting a plurality of landmarks in the sub-volume of interest (as described by method 300, shown in FIG. 3), determining transformation parameters for the sub-volume of interest based on the detected landmarks (as described in method 400, shown in FIG. 4), applying the transformation parameters to the sub-volume of interest to produce an aligned sub-volume of interest (as described in method 600, shown in FIG. 6), and determining confidence in the transformation parameters based on an aligned sub-volume of interest, e.g., the sub-volume of interest following application of the determined transformation parameters (as described in method 500, shown in FIG. 5).

Referring to FIG. 1, a method 100 for automatically aligning a 3D image volume is shown. The method 100 may be employed to align anatomical regions captured within 3D image volumes to standard planes and orientations, enabling radiologists or other medical imaging practitioners to quickly view anatomical regions of interest in standard orientations, which may facilitate rapid and accurate diagnosis based on the 3D image volume. In some embodiments, method 100 may be executed by an image processing system.

Method 100 begins at operation 102, wherein the image processing system receives a 3D image volume. The 3D image volume may comprise a sequence of 2D images representing a volume of an imaging subject. The 3D image volume may be acquired using various imaging modalities such as computed tomography (CT), magnetic resonance imaging (MRI), ultrasound, or other suitable imaging techniques. The 3D image volume may include a specific region of an imaging subject, such as the heart, brain, or other anatomical structures, and may contain multiple anatomical regions.

At operation 104, the image processing system preprocesses the 3D image volume to produce a sub-volume of interest. In some embodiments, operation 104 includes validating if the 3D volume is suitable for alignment before proceeding to further preprocessing. In one embodiment, the image processing system may determine if a desired field of view (FOV) is included in the 3D image volume. If the desired FOV is not included in the 3D image volume, the image processing system may discard the 3D image volume or request a new 3D image volume that includes the desired FOV. This may ensure an anatomical region of interest is included in 3D image volume, prior to proceeding with further preprocessing or image alignment.

In one embodiment, operation 104 includes selecting a subset of the plurality of 2D images that include the sub-volume of interest. This subset may then be cropped to remove non-anatomical regions, focusing on the relevant anatomical features. In some embodiments, the 3D image volume may include symmetrical anatomical features. For instance, the 3D image volume may include both the left and right hemispheres of the brain, or both the left and right lungs. In such cases, the image processing system may identify a pair of symmetrical anatomical features in the 3D image volume and select a sub-volume containing one of the anatomical features for further processing. This may reduce computational complexity and improve the efficiency of the image alignment process. In some embodiments, the sub-volume of interest selected at operation 104 may be determined by identifying a pair of symmetrical anatomical features in the 3D image volume. The sub-volume containing the first anatomical feature, and not containing the second anatomical feature, may be selected as the sub-volume of interest. The 3D image volume may also be preprocessed at operation 104 to remove non-anatomical regions. For example, the image processing system may crop the 3D image volume to remove regions that do not contain relevant anatomical information. This preprocessing step may focus the image alignment process on the anatomical regions of interest.

At operation 106, the image processing system detects a plurality of landmarks in the sub-volume of interest. The landmarks may correspond to specific anatomical structures or regions within the sub-volume of interest. In some embodiments, the plurality of landmarks may comprise at least three distinct landmarks, providing sufficient points in the image coordinate system to determine an anatomical plane of interest with respect to the image coordinate system. In some embodiments, the image processing system may employ a deep neural network trained to identify anatomical landmarks within the sub-volume of interest. The deep neural network may be trained using a variety of machine learning techniques and may be configured to identify anatomical landmarks, including points, 3D cylindrical structures, or specific anatomical structures. The landmarks detected by the deep neural network may be based on predefined anatomical landmarks associated with the desired planes of view. In some embodiments, the image processing system may filter or sort the detected landmarks based on their confidence scores. The confidence in detected landmarks may be determined based on the features of the detected landmarks, such as their shape and appearance. In one embodiment, a feature distribution for each landmark type may be created, and the confidence of the landmarks detected in the sub-volume may be determined by calculating a probability of the landmark, as encoded by its features, belonging to the feature distribution of its respective landmark type. In one embodiment, the image processing system may select a subset of landmarks from the plurality of landmarks detected in the sub-volume of interest. This subset of landmarks may include at least three landmarks, which may be used to determine an anatomical plane of interest with respect to the image coordinate system.

At operation 108, the image processing system estimates transformation parameters based on the plurality of landmarks to adjust rotation angles and translation of the sub-volume of interest. The transformation parameters may be used to align the sub-volume of interest with a desired orientation or position. In some embodiments, the image processing system estimates transformation parameters based on the plurality of landmarks detected in the sub-volume of interest. These transformation parameters may include rotation angles and translation vectors that are used to adjust the orientation and position of the sub-volume of interest. In one embodiment, the image processing system may select a subset of landmarks from the plurality of landmarks detected in the sub-volume of interest. This subset of landmarks may include at least three landmarks, which may be used to determine an anatomical plane of interest with respect to the image coordinate system. The selection of the subset of landmarks may be based on their confidence scores, with the most confident landmarks being selected for further processing. Once the anatomical plane of interest has been determined, the image processing system may estimate the rotation angles and translation vectors needed to align the sub-volume of interest with the anatomical plane of interest. This may involve comparing the positions of the selected landmarks against one or more pre-determined geometric constraints. The geometric constraints may be based on the known or expected positions, or relative positions, of the landmarks in a correctly aligned sub-volume of interest. By comparing the actual positions of the landmarks against these geometric constraints, the image processing system is enabled to estimate the rotation angles and translation vectors needed to align the sub-volume of interest with the anatomical plane of interest. The image processing system may use a variety of techniques to estimate the transformation parameters. For example, the image processing system may use optimization algorithms, machine learning techniques, or other suitable methods to estimate the rotation angles and translation vectors.

At operation 110, the image processing system adjusts rotation angles and translation of the sub-volume of interest using the transformation parameters to produce an aligned sub-volume of interest. The transformation parameters, which include rotation angles and translation vectors, are applied to the sub-volume of interest to generate the first aligned sub-volume. In some embodiments, adjusting the rotation angles and translation of the sub-volume of interest includes performing multiplanar reformation of the sub-volume of interest along the anatomical plane of interest, as determined at operation 108, and subsequently rotating the plane of interest until the positions of the landmarks satisfy one or more geometric constraints with respect to the image coordinate system. In one embodiment, the transformation parameters are used to rotate and translate the anatomical features captured in the sub-volume of interest with respect to the image coordinate system, such that a predefined anatomical plane is shown in a standard orientation with respect to the image coordinate system. This predefined anatomical plane may be determined based on the subset of landmarks detected in the sub-volume of interest. In another embodiment, the transformation parameters are used to adjust the sub-volume of interest such that it aligns with a desired orientation. This desired orientation may be pre-defined based on the type of anatomical structure being imaged or the specific diagnostic or therapeutic procedure being performed.

At operation 112, the image processing system determines confidence in the transformation parameters based on the aligned sub-volume of interest. The confidence may indicate the accuracy or reliability of the alignment of the aligned sub-volume. In one embodiment, the determination of con-fidence in the transformation parameters involves detecting the plurality of landmarks in the aligned sub-volume using the deep neural network used at operation 106. The positions of these detected landmarks in the aligned sub-volume are then compared to one or more pre-determined geometric constraints. The degree of satisfaction of these geometric constraints by the landmarks provides an indication of the accuracy of the alignment process. For instance, if the landmarks in the aligned sub-volume satisfy the geometric constraints to within a small deviation, the alignment pro-cess is likely to have been successful and the transformation parameters are therefore reliable. In another embodiment, the determination of confidence in the transformation parameters involves projecting the aligned sub-volume onto a projection plane to produce a projection image. This projection plane is parallel to the plurality of 2D images comprising the aligned sub-volume. The projection image is then mapped to a confidence score using a confidence estimation network. This confidence score provides a quan-titative measure of the accuracy of the alignment process. A high confidence score would suggest that the alignment process has been successful and the transformation param-eters are reliable.

At operation 114, the image processing system checks if the confidence in the transformation parameters is above a threshold. If the confidence is not above the threshold, the method 100 proceeds to iteratively refine the transformation parameters by returning to 106, wherein operations 106-114 may be repeated as described above, but with the first aligned sub-volume as opposed to the initially produced sub-volume. This iterative refinement process involves detecting the landmarks in the first aligned sub-volume, estimating refined transformation parameters based on these landmarks, adjusting the rotation angles and translation of the first aligned sub-volume using the refined transformation parameters to produce a second aligned sub-volume, and determining confidence in the refined transformation param-eters based on the second aligned sub-volume. In some embodiments, the iterative refinement of the transformation parameters may be repeated until either the confidence of the resultant aligned volume exceeds the confidence threshold, or a pre-determined number of iterations is exceeded, wherein the image processing system may indicate the automatic alignment is unsuccessful and may prompt a user to perform manual image alignment. However, if at opera-tion 114 the image processing system determines the con-fidence is above the confidence threshold, method 100 proceeds to operation 116.

At operation 116, the image processing system displays the aligned sub-volume via a display device. The aligned sub-volume may be visualized or presented to a user for further analysis or evaluation. In some embodiments, the image processing system may display the anatomical plane of interest, with the rotation and translation determined at operation 108 applied. In some embodiments, the image processing system may display the confidence score deter-mined at operation 112 alongside the aligned sub-volume. This may provide the user with an indication of the reliabil-ity of the alignment process. The image processing system may also provide an option for the user to manually adjust the alignment if the confidence score is below a certain level. This may ensure that the user has the final say in the alignment process. Following operation 116, method 100 may end.

Referring to FIG. 2, a method 200 for preprocessing a 3D image volume to produce a sub-volume of interest is shown. The method 200 may be employed to select a subset of 2D images from the 3D image volume that includes the desired field of view and to divide symmetrical anatomical features by sub-dividing the subset of images along a plane of symmetry.

At operation 202, the image processing system checks if the 3D image volume includes the desired field of view (FOV). The image processing system may determine if the desired FOV is included in the 3D image volume by analyzing the spatial extent of the 3D image volume and comparing it with a predetermined spatial extent of the desired FOV. The desired FOV may be predetermined based on the type of anatomical structure being imaged or the specific diagnostic or therapeutic procedure being per-formed. For instance, if the 3D image volume is intended for cardiac imaging, the desired FOV may include the entire heart and surrounding vasculature. If the 3D image volume is intended for brain imaging, the desired FOV may include the entire brain and surrounding structures. In some embodi-ments, the image processing system may employ machine learning model to automatically determine if the anatomical region of interest falls within the acquired 3D image volume. In some embodiments, the machine learning model may be trained to classify 3D image volumes according to the anatomical features captured therein, and/or output a prob-ability score indicating a probability of the 3D image volume including the anatomical feature or region of inter-est. If the 3D image volume does not include the desired FOV, method 200 may proceed to operation 204. In some embodiments, the image processing system may also check the quality of the 3D image volume at operation 202, such as the image resolution, signal-to-noise ratio, or other image quality metrics, to ensure that the 3D image volume is suitable for the subsequent image alignment process. If the image quality is below a predetermined threshold, the image processing system may proceed to operation 204.

If the 3D image volume does not include the desired field of view, or the quality of the 3D image volume is below a pre-determined threshold, method 200 proceeds to operation 204, wherein the image processing system displays a request to rescan the imaging subject via a display device. In some embodiments, the image processing system may provide feedback to the user or operator at operation 204, indicating that the 3D image volume does not include the desired FOV and suggesting appropriate corrective actions, such as adjusting the imaging parameters or repositioning the imaging subject. The request prompts the user to rescan the subject in order to obtain a 3D image volume that includes the desired field of view. Following operation 204, method 200 may end.

However, if at operation 202, the image processing system determines that the 3D image volume includes the desired field of view, method 200 proceeds to operation 206. At operation 206, the image processing system selects a subset of the plurality of 2D images comprising the 3D image volume which includes the sub-volume of interest. The subset of images is selected based on the desired field of view. This selection process may involve identifying the 2D images that contain the anatomical features of interest. As an example, if the desired FOV includes the heart, the image processing system may select the 2D images that contain the heart and surrounding vasculature. In some embodiments, the image processing system may employ a machine learning model trained to identify the anatomical features of interest in the 2D images. The machine learning model may be trained using a variety of machine learning techniques and may be configured to identify anatomical features, including points, 3D cylindrical structures, or specific anatomical structures. In some embodiments, the image processing system may also consider the quality of the 2D images when selecting the subset of images. For instance, the image processing system may select the 2D images that have a high signal-to-noise ratio, high resolution, or other desirable image quality metrics. This may ensure that the selected subset of images is suitable for the subsequent image alignment process.

At operation 208, the image processing system may optionally divide symmetrical anatomical features by subdividing the plurality of 2D images along a plane of symmetry. This division allows for the separation of symmetrical anatomical features into separate sub-volumes. As an example, if the 3D image volume includes both the left and right knees of an imaging subject, the image processing system may separate the left and right knees for separate processing. This may involve identifying a plane of symmetry in the 3D image volume and dividing the 3D image volume along this plane of symmetry. This may result in two sub-volumes, each containing one of the symmetrical anatomical features. Each of these sub-volumes may then be processed separately in the subsequent image alignment process. This may improve the efficiency of the image alignment process and may also improve the accuracy of the alignment by reducing the complexity of the anatomical features to be aligned. In some embodiments, only a first of two symmetrical anatomical features will be selected for subsequent imaging alignment.

At operation 210, the image processing system crops the subset of the plurality of 2D images to remove non-anatomical regions. In some embodiments, the image processing system may identify boundaries of the anatomical features of interest in each of the 2D images and removing the portions of the 2D images that lie outside these boundaries. This may be achieved by applying a segmentation algorithm to each of the 2D images to segment the anatomical features of interest from the background or non-anatomical regions. The segmentation algorithm may be a traditional image processing algorithm, such as thresholding, edge detection, region growing, or watershed segmentation, or it may be a machine learning-based algorithm, such as a convolutional neural network trained to segment the anatomical features of interest. In some embodiments, the image processing system may employ a deep learning model trained to identify and segment the anatomical features of interest in the 2D images. In some embodiments, the deep neural network may output a binary mask for each 2D image, where the pixels corresponding to the anatomical features of interest are assigned a value of one and all other pixels are assigned a value of zero. The image processing system may then apply these binary masks to the corresponding 2D images to remove the non-anatomical regions. Following operation 210, method 200 may end.

In this way method 200 enables the efficient preprocessing of a 3D image volume to produce a sub-volume of interest. This preprocessing may increase the success rate of downstream image alignment as it checks the 3D image volume for inclusion of the desired field of view. Further, by selecting a subset of 2D images that include the desired field of view, the image processing system is enabled to focus on the relevant anatomical features and ignore irrelevant regions, thereby reducing computational complexity and improving the efficiency of the image alignment process.

Referring to FIG. 3, a method 300 for detecting landmarks in a sub-volume of interest is shown. The method 300 may be employed by an image processing system to map the sub-volume of interest to a plurality of landmarks using a trained deep neural network, derive one or more landmarks based on the positions of the plurality of landmarks, determine confidence for each of the detected landmarks, and filter the plurality of landmarks based on confidence to obtain at least three landmarks in the sub-volume.

Method 300 begins at operation 302, wherein the image processing system maps the sub-volume of interest to a plurality of landmarks using a trained deep neural network. The deep neural network may be trained using a variety of machine learning techniques and may be configured to identify anatomical landmarks, including points, 3D cylindrical structures, or specific anatomical structures. The landmarks detected by the deep neural network may be based on predefined anatomical landmarks associated with the desired planes of view. The deep neural network may be trained on a large dataset of 3D image volumes, each annotated with the positions of the anatomical landmarks of interest. The training process may involve adjusting the parameters of the deep neural network to minimize the difference between the predicted positions of the landmarks and the actual positions of the landmarks in the training dataset. The trained deep neural network may then be used to predict the positions of the landmarks in new, unseen 3D image volumes. In some embodiments, the deep neural network may include multiple layers, each layer transforming the input data into a higher level of abstraction. For example, the first layer may detect edges in the 3D image volume, the second layer may detect basic shapes, and subsequent layers may detect more complex anatomical structures. The final layer of the deep neural network may output the predicted positions of the landmarks in the 3D image volume. In some embodiments, the deep neural network may be a convolutional neural network (CNN). The CNN may include convolutional layers that apply a set of filters to the input data, pooling layers that reduce the dimensionality of the data, and fully connected layers that output the predicted positions of the landmarks.

In some embodiments, the deep neural network may be a recurrent neural network (RNN), which is configured to process sequential data. The RNN may be advantageously employed when the 3D image volume is viewed as a sequence of 2D image slices. The RNN may process each 2D image slice in sequence, maintaining an internal state that captures the information from the previous slices, and output the predicted positions of the landmarks in the 3D image volume. In some embodiments, the deep neural network may be a combination of a CNN and an RNN. The CNN portion of the network may process each 2D image slice independently to detect local features, and the RNN portion of the network may process the sequence of 2D image slices to capture the spatial relationships between the features across different slices. In some embodiments, the deep neural network may be trained using transfer learning, where a pre-trained network is fine-tuned on the specific task of landmark detection. The pre-trained network may have been trained on a large, general-purpose dataset, and may have learned to extract features from image data. By fine-tuning the pre-trained network on the specific task of landmark detection, the image processing system may leverage the feature extraction capabilities of the pre-trained network, while adapting it to the specific task of anatomical landmark detection. In some embodiments, the deep neural network may be trained using unsupervised learning, where the network learns to extract useful features from the 3D image volumes without the need for annotated training data. The unsupervised learning may involve training the network to reconstruct the input data, to generate new data similar to the input data, or to cluster the input data into groups. The features learned by the network during the unsupervised learning may then be used to detect the landmarks in the 3D image volumes.

At operation 304, the image processing system may optionally derive one or more landmarks based on the positions of the plurality of landmarks. The derivation process may include utilizing the positions of one or more landmarks detected at operation 302, and combining this with known anatomical relationships, to obtain position information for one or more anatomical landmarks not directly detected. For instance, in one embodiment, the image processing system may derive a landmark corresponding to the center of an anatomical structure by averaging the positions of two or more landmarks detected at operation 302 that are known to lie on the boundary of the anatomical structure. In another embodiment, the image processing system may derive a landmark corresponding to an anatomical feature that is known to be located at a fixed distance and direction from a landmark detected at operation 302. For example, if a landmark corresponding to the apex of the heart is detected, a landmark corresponding to the base of the heart may be derived by moving a fixed distance away from the apex of the heart. In yet another embodiment, the image processing system may derive a landmark corresponding to the intersection of two or more anatomical structures by identifying landmarks detected at operation 302 that lie on each of the anatomical structures and calculating their intersection point. For example, if landmarks corresponding to the left and right lung boundaries are detected, a landmark corresponding to the mediastinum, which is the space between the lungs, may be derived by calculating the intersection of the lung boundaries. In some embodiments, the image processing system may derive additional landmarks based on the positions of the plurality of landmarks detected at operation 302 and the known anatomical relationships between these landmarks. For instance, the image processing system may derive a landmark corresponding to the center of gravity of an anatomical structure by calculating the weighted average of the positions of the landmarks detected at operation 302 that lie within the anatomical structure, where the weights are proportional to the voxel intensities at the landmark positions. In some embodiments, the image processing system may derive a landmark corresponding to an anatomical feature that is not directly visible in the 3D image volume. For example, the image processing system may derive a landmark corresponding to the center of a blood vessel by fitting a 3D cylindrical model to the positions of landmarks detected at operation 302 that lie on the boundary of the blood vessel. In some embodiments, the image processing system may derive a landmark corresponding to an anatomical feature that is only partially visible in the 3D image volume. For example, the image processing system may derive a landmark corresponding to the tip of a bone by extrapolating from the positions of landmarks detected at operation 302 that lie on the visible portion of the bone. These derived landmarks may provide additional reference points for aligning the 3D image volume, and may increase the accuracy and robustness of the alignment process.

At operation 306, the image processing system determines confidence for each of the detected landmarks. This confidence determination allows the system to assess the reliability and accuracy of each landmark. In one embodiment, the confidence determination at operation 306 may involve calculating a probability of each landmark, as encoded by its features, belonging to a feature distribution of its respective landmark type. The feature distribution for each landmark type may be created based on a training dataset of known anatomical landmarks. The features of the detected landmarks may include, but are not limited to, shape, size, texture, and appearance characteristics. For example, a landmark that is a point may have a feature distribution based on its spatial coordinates, while a landmark that is an anatomical structure may have a feature distribution based on its shape and size characteristics. In another embodiment, the confidence determination at operation 306 may involve comparing the detected landmarks to a set of predefined anatomical landmarks associated with the desired planes of view. The comparison may involve calculating a similarity score between the detected landmarks and the predefined anatomical landmarks. The similarity score may be based on various factors such as the spatial proximity of the detected landmarks to the predefined anatomical landmarks, the similarity in shape and appearance between the detected landmarks and the predefined anatomical landmarks, and the consistency of the detected landmarks with known anatomical relationships.

At operation 308, the image processing system filters the plurality of landmarks based on confidence to obtain at least three landmarks in the sub-volume. By filtering the landmarks based on a probability of said landmark belonging to a respective feature distribution of its landmark type/class, a probability of spurious landmarks being used for downstream image alignment is reduced. In one embodiment, the filtering process at operation 308 may involve sorting the detected landmarks based on their confidence scores and selecting the top three landmarks with the highest confidence scores. In another embodiment, the filtering process at operation 308 may involve setting a confidence threshold and selecting landmarks whose confidence scores exceed this threshold. The confidence threshold may be determined based on the requirements of the specific application, the quality of the 3D image volume, or the performance of the deep neural network. In yet another embodiment, the filtering process at operation 308 may involve applying a machine learning model to predict the reliability of each landmark based on its features and confidence score. The machine learning model may be trained on a dataset of known landmarks, where each landmark is labeled with its reliability. The features used by the machine learning model may include the confidence score of the landmark, the features of the landmark as encoded by the deep neural network, and other relevant features such as the quality of the 3D image volume or the performance of the deep neural network. The machine learning model may output a reliability score for each landmark, and the landmarks with the highest reliability scores may be selected for further processing. In some embodiments, the filtering process at operation 308 may also involve clustering the detected landmarks based on their spatial proximity to each other, and selecting one landmark from each cluster based on its confidence score. This may help to ensure that the selected landmarks are distributed across different anatomical regions, thereby improving the robustness and accuracy of the subsequent image alignment processes.

In some embodiments, the filtering process at operation 308 may involve a combination of the above embodiments. For example, the image processing system may first sort the detected landmarks based on their confidence scores, then apply a confidence threshold to select a subset of the sorted landmarks, and finally apply a machine learning model to predict the reliability of the subset of landmarks and select the most reliable landmarks for further processing. Following operation 308, method 300 ends.

In this way, method 300 enables the image processing system to accurately and efficiently detect and select anatomical landmarks within a sub-volume of interest. This is achieved through the use of a trained deep neural network, which is capable of identifying a variety of anatomical landmarks based on predefined anatomical landmarks associated with the desired planes of view. The method further enhances the accuracy of landmark detection by deriving additional landmarks based on the positions of the detected landmarks and known anatomical relationships. This provides a more comprehensive set of reference points for subsequent image alignment processes. Moreover, method 300 incorporates a confidence determination step, which assesses the reliability of each detected landmark based on its features and the probability of it belonging to a feature distribution of its respective landmark type. This ensures that only the potentially spurious landmarks are not selected for further processing, thereby reducing the likelihood of erroneous landmarks influencing the image alignment process.

Figure 4:
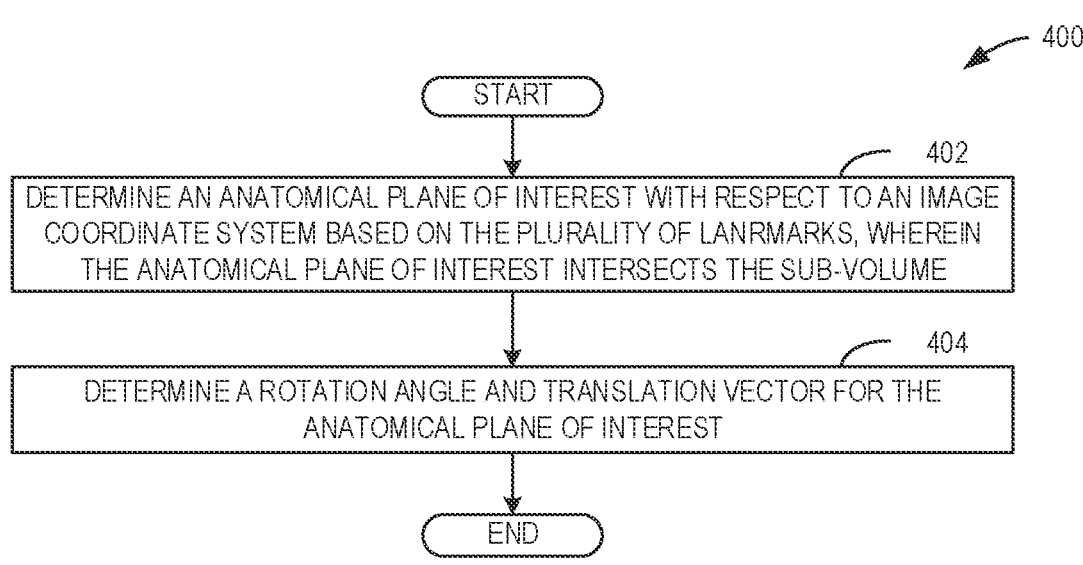
FIG. 4 is a flowchart illustrating a method 400 for estimating rotation angles and translation vectors for an anatomical plane of interest, according to an embodiment of the current disclosure.

Referring to FIG. 4, a method 400 for estimating rotation angles and translation vectors for an anatomical plane of interest is shown. The method 400 may be employed by an image processing system to determine an anatomical plane of interest with respect to an image coordinate system based on a plurality of landmarks, wherein the anatomical plane of interest intersects the sub-volume, and to determine a rotation angle and translation vector for the anatomical plane of interest.

At operation 402, the image processing system determines an anatomical plane of interest with respect to an image coordinate system based on the plurality of landmarks. This determination allows the system to identify the specific plane within the sub-volume that is of interest for alignment. In one embodiment, the determination of the anatomical plane of interest involves utilizing the subset of landmarks from the plurality of landmarks determined at operation 308 of method 300. This subset of landmarks may include at least three landmarks, which provide sufficient points in the image coordinate system to determine an anatomical plane of interest with respect to the image coordinate system. The selection of the subset of landmarks may be based on their confidence scores, with the most confident landmarks being selected for further processing.

Once the subset of landmarks has been selected, the image processing system may determine the anatomical plane of interest by fitting a plane to the positions of the selected landmarks in the image coordinate system. This may involve using a least squares fitting method or other suitable plane fitting techniques. The anatomical plane of interest is thus determined such that it best fits the positions of the selected landmarks in the image coordinate system.

In some embodiments, the three or more landmarks do not define the anatomical plane of interest, but a plane with a fixed relationship to the anatomical plane of interest, and in such embodiments following fitting of a plane to the three or more landmarks, the anatomical plane of interest is derived from the fitted plane using the fixed relationship between the fitted plane and the anatomical plane of interest. As an example the three or more landmarks may define a reference plane that is parallel to, but not coincident with, the anatomical plane of interest. In such cases, the anatomical plane of interest may be derived from the fitted plane by applying a translation along the normal to the fitted plane. The magnitude and direction of the translation may be determined based on the known or expected distances between the landmarks and the anatomical plane of interest. For instance, if the landmarks are located on the surface of an organ and the anatomical plane of interest is located at the center of the organ, the translation may be equal to half the thickness of the organ and directed towards the interior of the organ. In some embodiments, the three or more landmarks may define a reference plane that is orthogonal to the anatomical plane of interest. In such cases, the anatomical plane of interest may be derived from the fitted plane by rotating the fitted plane about an axis that is parallel to the intersection of the fitted plane and the anatomical plane of interest. The angle of rotation may be determined based on the known or expected angles between the landmarks and the anatomical plane of interest. For instance, if the landmarks are located on the surface of an organ and the anatomical plane of interest is a cross-sectional plane of the organ, the angle of rotation may be 90 degrees.

In yet other embodiments, the three or more landmarks may define a reference plane that is oblique to the anatomical plane of interest. In such cases, the anatomical plane of interest may be derived from the fitted plane by applying a combination of rotation and translation. The rotation may align the normal to the fitted plane with the normal to the anatomical plane of interest, and the translation may shift the fitted plane to coincide with the anatomical plane of interest. The rotation axis, rotation angle, translation direction, and translation magnitude may be determined based on the known or expected relationships between the landmarks and the anatomical plane of interest.

At operation 404, the image processing system determines a rotation angle and translation vector for the anatomical plane of interest. This determination allows the image processing system to adjust the orientation and position of the sub-volume to align it with the desired anatomical plane. In one embodiment, the determination of the rotation angle and translation vector involves comparing the positions of the selected landmarks against one or more predetermined geometric constraints. These geometric constraints may be based on the known or expected positions, or relative positions, of the landmarks in a correctly aligned sub-volume of interest with respect to the image coordinate system. By comparing the actual positions of the landmarks against these geometric constraints, the image processing system is enabled to estimate the rotation angles and translation vectors needed to align the sub-volume of interest with the anatomical plane of interest. In some embodiments, the geometric constraints may include distances between pairs of landmarks with respect to one or more axes of the image coordinate system. As an example, a geometric constraint which may be used to determine a rotation angle may specify that in a correctly aligned sub-volume, a difference between a first y-coordinate of a first landmark and a second y-coordinate of a second landmark is zero, or within a threshold value of zero. In another example, a geometric constraint which may be used to determine a translation vector may specify that a position of a landmark be within a threshold distance of a midpoint of a range of an axes of the image coordinate system. In another embodiment, the geometric constraints may include angles between lines connecting pairs of landmarks with respect to one or more axes of the image coordinate system. For instance, a geometric constraint may specify that in a correctly aligned sub-volume, the angle between a line connecting a first landmark and a second landmark and a point on the x-axis of the image coordinate system equal to the x-coordinate of the second landmark is 90 degrees, or within a threshold value of 90 degrees. In yet another embodiment, the geometric constraints may include relative positions of landmarks with respect to each other. For example, a geometric constraint may specify that in a correctly aligned sub-volume, a first landmark is located above a second landmark, or a third landmark is located to the right of a fourth landmark. This may be advantageous when aligning anatomical structures that have a known spatial relationship to each other in a correctly aligned sub-volume.

In some embodiments the image processing system may directly calculate the rotation angle and translation vector using an analytical solution to a system of equations including the current positions of the landmarks or the projections of the landmarks onto one or more axes of the image coordinate system, and the geometric constraints. In some embodiments, the image processing system may use optimization algorithms to estimate the rotation angles and translation vectors. The optimization algorithms may minimize a cost function that measures the deviation of the actual positions of the landmarks from their expected positions according to the geometric constraints. The cost function may include terms for each of the geometric constraints, and may be weighted to give more importance to certain constraints over others. The optimization algorithms may include gradient descent, Newton's method, or other suitable optimization techniques. Following operation 404, method 400 may end.

Referring to FIG. 5, a method 500 for determining confidence in the alignment of a sub-volume of interest is shown. The method 500 may be employed by an image processing system to detect a plurality of landmarks in the aligned sub-volume of interest using a deep neural network, compare the positions of the plurality of landmarks in the aligned sub-volume of interest to one or more pre-determined geometric constraints to determine a degree of geometric constraint satisfaction, determine a geometric constraint confidence based on the degree of geometric constraint satisfaction, project the aligned sub-volume of interest onto a projection plane to produce a projection image, map the projection image to a projection confidence using a confidence estimation network, and determine an overall confidence for the aligned sub-volume by combining the geometric constraint confidence with the projection confidence.

At operation 502, the image processing system detects the plurality of landmarks in the aligned sub-volume of interest using the deep neural network. This detection allows the system to identify the positions of the landmarks within the aligned sub-volume. In one embodiment, the deep neural network used for detecting landmarks in the aligned sub-volume of interest may be the same as or similar to the deep neural network used in the initial detection of landmarks in the sub-volume of interest (such as at operation 302). The deep neural network may be trained using a variety of machine learning techniques and may be configured to identify anatomical landmarks, including points, 3D cylindrical structures, or specific anatomical structures. The landmarks detected by the deep neural network may be based on predefined anatomical landmarks associated with the desired planes of view.

Following the landmark detection, at operation 504, the image processing system compares the positions of the plurality of landmarks in the aligned sub-volume of interest to one or more pre-determined geometric constraints to determine a degree of geometric constraint satisfaction. This comparison allows the system to assess how well the aligned sub-volume satisfies the desired geometric constraints. In one embodiment, the geometric constraints may be based on the known or expected positions, or relative positions, of the landmarks in a correctly aligned sub-volume of interest. For instance, if the anatomical region of interest is the heart, the geometric constraints may specify that certain landmarks (e.g., the apex of the heart and the base of the heart) should be located at certain positions relative to each other and to the image coordinate system in a correctly aligned sub-volume. By comparing the actual positions of the landmarks in the aligned sub-volume against these geometric constraints, the image processing system can determine the degree to which the geometric constraints are satisfied.

In some embodiments, the comparison of the positions of the landmarks to the geometric constraints may involve calculating a distance between each landmark and its corresponding position as specified by the geometric constraints. The distances may then be aggregated, for example, by summing or averaging, to produce a measure of the degree of geometric constraint satisfaction. In other embodiments, the comparison may involve calculating a measure of the deviation of the positions of the landmarks from the geometric constraints. This measure of deviation may be based on a statistical measure such as standard deviation or variance, or on a geometric measure such as the volume of the smallest polyhedron encompassing all the landmarks and their corresponding positions as specified by the geometric constraints.

At operation 506, the image processing system determines a geometric constraint confidence based on the degree of geometric constraint satisfaction. This determination allows the system to quantify the level of confidence in the alignment based on the satisfaction of the geometric constraints. In one embodiment, the geometric constraint confidence may be a function of the degree of geometric constraint satisfaction, where a higher degree of satisfaction corresponds to a higher confidence. The function may be a linear function, a non-linear function, or a step function, among others. In some embodiments, the geometric constraint confidence may be normalized to a range between a minimum confidence value and a maximum confidence value. For example, the geometric constraint confidence may be normalized to a range between 0 and 1, where 0 represents no confidence and 1 represents full confidence. The normalization may be performed using a variety of techniques, such as min-max normalization, z-score normalization, or decimal scaling normalization, among others. In some embodiments, the geometric constraint confidence may be adjusted based on additional factors, such as the quality of the 3D image volume, the complexity of the anatomical region of interest, or the performance of the deep neural network in detecting the landmarks. For example, if the 3D image volume is of low quality (e.g., due to motion artifacts or low signal-to-noise ratio), the geometric constraint confidence may be reduced to reflect the increased uncertainty in the alignment. Similarly, if the anatomical region of interest is complex (e.g., due to the presence of multiple overlapping structures or due to variability in anatomy among different individuals), the geometric constraint confidence may be reduced to reflect the increased difficulty in alignment.

Following the determination of the geometric constraint confidence, at operation 508, the image processing system projects the aligned sub-volume of interest onto a projection plane to produce a projection image. This projection process involves transforming the 3D aligned sub-volume into a 2D projection image. The projection plane is parallel to the plurality of 2D images comprising the aligned sub-volume of interest. This projection process can be achieved using various projection techniques known in the field of medical imaging, such as Maximum Intensity Projection (MIP), Minimum Intensity Projection (MinIP), or Average Intensity Projection (AIP). The projection image provides a comprehensive view of the aligned sub-volume, which can be used to further assess the quality of the alignment, at a reduced computational cost compared to approaches which utilize the un-projected data of the aligned sub-volume.

At operation 510, the image processing system maps the projection image to a projection confidence using a confidence estimation network. This mapping allows the system to determine the confidence in the alignment based on the quality of the projection image. The confidence estimation network may be a machine learning or deep learning network trained to estimate the confidence of alignment based on the projection image. The network may be trained using a variety of machine learning techniques and may be configured to map the projection image to a confidence score. The confidence score provides a quantitative measure of the accuracy of the alignment process. A high confidence score would suggest that the alignment process has been successful and the transformation parameters are reliable.

At operation 512, the image processing system determines an overall confidence for the aligned sub-volume by combining the geometric constraint confidence with the projection confidence. This overall confidence provides a comprehensive measure of the accuracy of the alignment process, taking into account both the satisfaction of geometric constraints and the projection confidence. The overall confidence may be determined using various combination methods, such as weighted averaging, maximum, minimum, or other suitable combination methods. The overall confidence may be used to decide whether the alignment process is successful or whether further refinement of the transformation parameters is needed. If the overall confidence is above a predetermined threshold, the alignment process may be considered successful. Otherwise, the alignment process may be iteratively refined until the overall confidence exceeds the threshold or a predetermined number of iterations is reached. Following operation 512, method 500 may end.

In this way, method 500 enables an image processing system to determine the confidence in the alignment of a sub-volume of interest in a comprehensive and robust manner. By combining the geometric constraint confidence with the projection confidence, the system can account for both the satisfaction of geometric constraints and the quality of the projection image in assessing the accuracy of the alignment process. This dual approach to confidence estimation may provide a more reliable measure of alignment accuracy than either method alone, potentially leading to improved diagnostic accuracy and efficiency in medical imaging applications. In this way, method 500 can facilitate automatic image alignment in medical imaging applications, potentially improving diagnostic accuracy and efficiency, reducing the need for manual image alignment, and enhancing patient care.

Referring to FIG. 6, a method 600 for aligning a sub-volume of interest with an anatomical plane of interest is shown. The method 600 may be employed by an image processing system to adjust the orientation and position of the sub-volume to align it with the desired anatomical plane.

At operation 602, the image processing system reformats the sub-volume of interest along the anatomical plane of interest to produce a reformatted sub-volume of interest. This operation involves re-slicing the sub-volume of interest into a sequence of 2D image slices parallel to the anatomical plane of interest. In one embodiment, the reformatting process at operation 602 may involve the use of multiplanar reformatting (MPR) techniques. MPR is a post-processing technique that allows for the visualization of images in various planes. In this context, MPR can be used to re-slice the sub-volume of interest into a sequence of 2D image slices parallel to the anatomical plane of interest. This can be particularly useful when the original imaging plane does not align with the anatomical plane of interest. As an example, the sub-volume of interest may be a region of the brain captured in a sagittal plane, but the anatomical plane of interest may be the coronal plane. Using MPR, the image processing system can reformat the sagittal images into a sequence of 2D image slices parallel to the coronal plane. This allows for a more accurate and detailed analysis of the region of interest.

At operation 604, the image processing system applies the rotation angle to the reformatted sub-volume of interest. This operation involves rotating the reformatted sub-volume around the appropriate axis to achieve the desired rotation angle. In some embodiments, the image processing system may apply a rotation matrix to the sub-volume of interest at operation 604. The rotation matrix may be applied to each voxel in the sub-volume of interest to rotate the sub-volume such anatomical landmarks within the sub-volume of interest are rotated into positions estimated to satisfy one or more geometric constraints. This rotation may involve adjusting the orientation of the sub-volume about one or more axes of rotation.

At operation 606, the image processing system applies the translation vector to the reformatted sub-volume of interest to produce the aligned sub-volume of interest. This operation involves shifting the reformatted sub-volume along the appropriate axis to achieve the desired translation. The translation vector may comprise a vector in three-dimensional space and may therefore comprise a vector of three values indicating a magnitude of translation to be applied to each voxel in the sub-volume of interest along each of three basis vectors/axis of the image coordinate system. Following operation 606, method 600 may end.

Method 600 enables the image processing system is to align the sub-volume of interest with the anatomical plane of interest, allowing for accurate analysis and visualization of the anatomical structures within the sub-volume. Method 600 is intended to provide one exemplary approach for applying transformation parameters to align a sub-volume of interest, however it will be appreciated that alternative methods for defining alignment transformations, and applying said transformations, are encompassed by this disclosure. As an example, in certain embodiments, the image processing system may apply an affine transformation to the sub-volume of interest to produce the aligned sub-volume of interest. The affine transformation may include a combination of rotation, translation, scaling, and shearing operations. The parameters of the affine transformation may the transformation parameters estimated at operation 108 (FIG. 1). The affine transformation may be applied to each voxel in the sub-volume of interest to adjust the orientation, position, size, and shape of the sub-volume such that it aligns with the anatomical plane of interest. In some embodiments, the image processing system may apply a non-linear transformation to the sub-volume of interest. The non-linear transformation may be used to correct for distortions in the sub-volume of interest that may be difficult to correct using linear transformations such as rotation, translation, scaling, and shearing. The parameters of the non-linear transformation may be determined based on the transformation parameters estimated at operation 108 (FIG. 1), as well as additional parameters estimated based on the characteristics of the sub-volume of interest. The non-linear transformation may be applied to each voxel in the sub-volume of interest to adjust the orientation, position, size, and shape of the sub-volume such that it aligns with the anatomical plane of interest.

Referring now to FIG. 7, a magnetic resonance imaging (MRI) apparatus 710 is shown, wherein the MRI apparatus 710 includes a magnetostatic field magnet unit 712, a gradient coil unit 713, an RF coil unit 714, an RF body or volume coil unit 715, a transmit/receive (T/R) switch 720, an RF driver unit 722, a gradient coil driver unit 723, a data acquisition unit 724, a controller unit 725, a patient table or bed 726, a data processing unit 731, an operating console unit 732, and a display unit 733. In some embodiments, the RF coil unit 714 is a surface coil, which is a local coil typically placed proximate to the anatomy of interest of a subject 716. Herein, the RF body coil unit 715 is a transmit coil that transmits RF signals, and the local surface RF coil unit 714 receives the MR signals. As such, the transmit body coil (e.g., RF body coil unit 715) and the surface receive coil (e.g., RF coil unit 714) are separate but electromagnetically coupled components. The MRI apparatus 710 transmits electromagnetic pulse signals to the subject 716 placed in an imaging space 718 with a static magnetic field formed to perform a scan for obtaining magnetic resonance signals from the subject 716. One or more images of the subject 716 can be reconstructed based on the magnetic resonance signals thus obtained by the scan.

The magnetostatic field magnet unit 712 includes, for example, an annular superconducting magnet, which is mounted within a toroidal vacuum vessel. The magnet defines a cylindrical space surrounding the subject 716 and generates a constant primary magnetostatic field $B_0$.

The MRI apparatus 710 also includes a gradient coil unit 713 that forms a gradient magnetic field in the imaging space 718 so as to provide the magnetic resonance signals received by the RF coil arrays with three-dimensional positional information. The gradient coil unit 713 includes three gradient coil systems, each of which generates a gradient magnetic field along one of three spatial axes perpendicular to each other, and generates a gradient field in each of a frequency encoding direction, a phase encoding direction, and a slice selection direction in accordance with the imaging condition. More specifically, the gradient coil unit 713 applies a gradient field in the slice selection direction (or scan direction) of the subject 716, to select the slice; and the RF body coil unit 715 or the local RF coil arrays may transmit an RF pulse to a selected slice of the subject 716. The gradient coil unit 713 also applies a gradient field in the phase encoding direction of the subject 716 to phase encode the magnetic resonance signals from the slice excited by the RF pulse. The gradient coil unit 713 then applies a gradient field in the frequency encoding direction of the subject 716 to frequency encode the magnetic resonance signals from the slice excited by the RF pulse.

The RF coil unit 714 is disposed, for example, to enclose the region to be imaged of the subject 716. In some examples, the RF coil unit 714 may be referred to as the surface coil or the receive coil. In the static magnetic field space or imaging space 718 where a static magnetic field $B_0$ is formed by the magnetostatic field magnet unit 712, the RF coil unit 715 transmits, based on a control signal from the controller unit 725, an RF pulse that is an electromagnet wave to the subject 716 and thereby generates a high-frequency magnetic field $B_1$. This excites a spin of protons in the slice to be imaged of the subject 716. The RF coil unit 714 receives, as a magnetic resonance signal, the electromagnetic wave generated when the proton spin thus excited in the slice to be imaged of the subject 716 returns into alignment with the initial magnetization vector. In some embodiments, the RF coil unit 714 may transmit the RF pulse and receive the MR signal. In other embodiments, the RF coil unit 714 may only be used for receiving the MR signals, but not transmitting the RF pulse.

The RF body coil unit 715 is disposed, for example, to enclose the imaging space 718, and produces RF magnetic field pulses orthogonal to the main magnetic field $B_0$ produced by the magnetostatic field magnet unit 712 within the imaging space 718 to excite the nuclei. In contrast to the RF coil unit 714, which may be disconnected from the MRI apparatus 710 and replaced with another RF coil unit, the RF body coil unit 715 is fixedly attached and connected to the MRI apparatus 710. Furthermore, whereas local coils such as the RF coil unit 714 can transmit to or receive signals from only a localized region of the subject 716, the RF body coil unit 715 generally has a larger coverage area. The RF body coil unit 715 may be used to transmit or receive signals to the whole body of the subject 716, for example. Using receive-only local coils and transmit body coils provides a uniform RF excitation and good image uniformity at the expense of high RF power deposited in the subject. For a transmit-receive local coil, the local coil provides the RF excitation to the region of interest and receives the MR signal, thereby decreasing the RF power deposited in the subject. It should be appreciated that the particular use of the RF coil unit 714 and/or the RF body coil unit 715 depends on the imaging application.

The T/R switch 720 can selectively electrically connect the RF body coil unit 715 to the data acquisition unit 724 when operating in receive mode, and to the RF driver unit 722 when operating in transmit mode. Similarly, the T/R switch 720 can selectively electrically connect the RF coil unit 714 to the data acquisition unit 724 when the RF coil unit 714 operates in receive mode, and to the RF driver unit 722 when operating in transmit mode. When the RF coil unit 714 and the RF body coil unit 715 are both used in a single scan, for example if the RF coil unit 714 is configured to receive MR signals and the RF body coil unit 715 is configured to transmit RF signals, then the T/R switch 720 may direct control signals from the RF driver unit 722 to the RF body coil unit 715 while directing received MR signals from the RF coil unit 714 to the data acquisition unit 724. The coils of the RF body coil unit 715 may be configured to operate in a transmit-only mode or a transmit-receive mode. The coils of the local RF coil unit 714 may be configured to operate in a transmit-receive mode or a receive-only mode.

The RF driver unit 722 includes a gate modulator (not shown), an RF power amplifier (not shown), and an RF oscillator (not shown) that are used to drive the RF coils (e.g., RF coil unit 715) and form a high-frequency magnetic field in the imaging space 718. The RF driver unit 722 modulates, based on a control signal from the controller unit 725 and using the gate modulator, the RF signal received from the RF oscillator into a signal of predetermined timing having a predetermined envelope. The RF signal modulated by the gate modulator is amplified by the RF power amplifier and then output to the RF coil unit 715.

The gradient coil driver unit 723 drives the gradient coil unit 713 based on a control signal from the controller unit 725 and thereby generates a gradient magnetic field in the imaging space 718. The gradient coil driver unit 723 includes three systems of driver circuits (not shown) corresponding to the three gradient coil systems included in the gradient coil unit 713.

The data acquisition unit 724 includes a pre-amplifier (not shown), a phase detector (not shown), and an analog/digital converter (not shown) used to acquire the magnetic resonance signals received by the RF coil unit 714. In the data acquisition unit 724, the phase detector phase detects, using the output from the RF oscillator of the RF driver unit 722 as a reference signal, the magnetic resonance signals received from the RF coil unit 714 and amplified by the pre-amplifier, and outputs the phase-detected analog magnetic resonance signals to the analog/digital converter for conversion into digital signals. The digital signals thus obtained are output to the data processing unit 731.

The MRI apparatus 710 includes a bed 726 for placing the subject 716 thereon. The subject 716 may be moved inside and outside the imaging space 718 by moving the bed 726 based on control signals from the controller unit 725.

The controller unit 725 includes a computer and a recording medium on which a program to be executed by the computer is recorded. The program when executed by the computer causes various parts of the apparatus to carry out operations corresponding to pre-determined scanning. The recording medium may comprise, for example, a ROM, flexible disk, hard disk, optical disk, magneto-optical disk, CD-ROM, or non-volatile memory card. The controller unit 725 is connected to the operating console unit 732 and processes the operation signals input to the operating console unit 732 and furthermore controls the bed 726, RF driver unit 722, gradient coil driver unit 723, and data acquisition unit 724 by outputting control signals to them. The controller unit 725 also controls, to obtain a desired image, the data processing unit 731 and the display unit 733 based on operation signals received from the operating console unit 732.

The operating console unit 732 includes user input devices such as a touchscreen, keyboard and a mouse. The operating console unit 732 is used by an operator, for example, to input such data as an imaging protocol and to set a region where an imaging sequence is to be executed. The data about the imaging protocol and the imaging sequence execution region are output to the controller unit 725.

The data processing unit 731 includes a computer and a recording medium on which a program to be executed by the computer to perform predetermined data processing is recorded. The data processing unit 731 is connected to the controller unit 725 and performs data processing based on control signals received from the controller unit 725. The data processing unit 731 is also connected to the data acquisition unit 724 and generates spectrum data by applying various image processing operations to the magnetic resonance signals output from the data acquisition unit 724.

In one example, the recording medium of the data processing unit 731 may include instructions for automatic image aligning of acquired 3D medical image volumes.

The display unit 733 includes a display device and displays an image on the display screen of the display device based on control signals received from the controller unit 725. The display unit 733 displays, for example, an image regarding an input item about which the operator inputs operation data from the operating console unit 732. The display unit 733 also displays a two-dimensional (2D) slice image or three-dimensional (3D) image of the subject 716 generated by the data processing unit 731.

Though a MRI system is described by way of example, it should be understood that the present techniques for automatic alignment of 3D medical image volumes may also be useful when applied to images acquired using other imaging modalities, such as CT, tomosynthesis, PET, C-arm angiography, and so forth. The present discussion of an MRI imaging modality is provided merely as an example of one suitable imaging modality.

Figure 8:
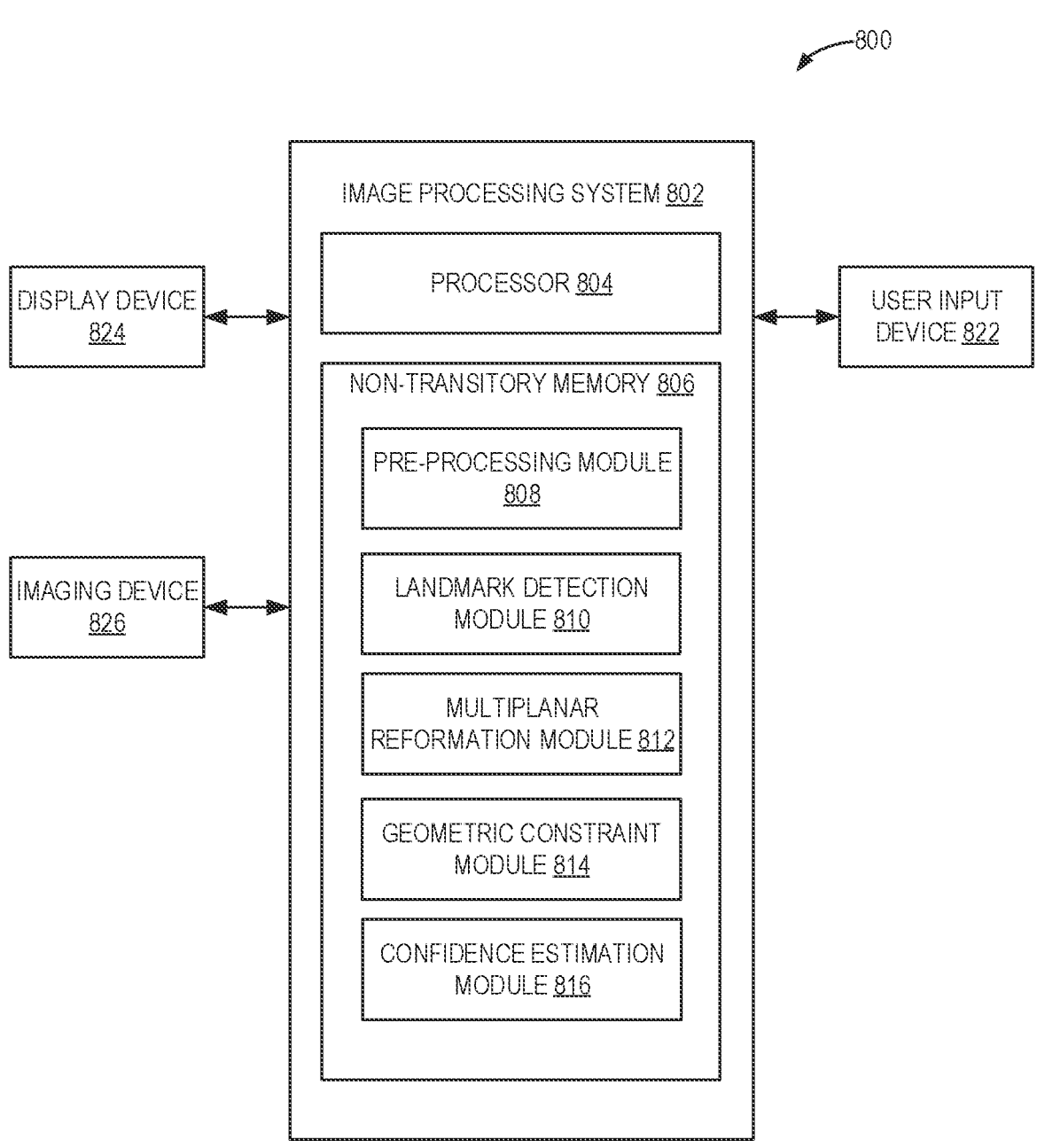
FIG. 8 is a block diagram of an image processing system according to an embodiment of the disclosure.

Referring to FIG. 8, an image processing system 802, incorporated into an imaging system 800, is shown. Imaging system 800 may be configured to acquire 3D medical images of an imaging subject using an imaging device 826, and process the acquired 3D medical image using image processing system 802, e.g., to automatically align the 3D medical image with one or more standard views. The aligned images may be displayed to a user via display device 824. User input may be received by the imaging system via user input device 822, wherein one or more of image acquisition and image alignment may be adjusted based on the user input received. As an example, following a 3D image acquisition, a user may specify an anatomical region of interest for which the user wishes to view one or more standard views. The image processing system 802 may receive the user input from the user input device 822 and automatically determine transformation parameters to align the anatomical region of interest to produce the requested standard views, e.g., using multiplanar reformation (MPR) module 812. The image processing system 802 may then automatically apply the transformation parameters to the 3D medical image to produce an aligned sub-volume of interest, and may display the aligned sub-volume of interest (or one or more 2D image slices thereof) to the user via the display device 824.

In some embodiments, at least a portion of image processing system 802 is disposed at a device (e.g., edge device, server, etc.) communicably coupled to the MRI system 710 via wired and/or wireless connections. In some embodiments, at least a portion of image processing system 802 is disposed at a separate device (e.g., a workstation) which can receive images from the MRI system 710 or from a storage device which stores the images/data generated by the MRI system 710. Image processing system 802 may be operably/communicatively coupled to user input device 822 and a display device 824. User input device 822 may be integrated into an MRI system, such as at operating console unit 732 of the MRI system 710. Similarly, display device 824 may be integrated into an MRI system, such as at display unit 733 of MRI system 710.

Image processing system 802 includes a processor 804 configured to execute machine readable instructions stored in non-transitory memory 806. Processor 804 may be single core or multi-core, and the programs executed thereon may be configured for parallel or distributed processing. In some embodiments, processor 804 may optionally include individual components that are distributed throughout two or more devices, which may be remotely located and/or configured for coordinated processing. In some embodiments, one or more aspects of processor 804 may be virtualized and executed by remotely-accessible networked computing devices configured in a cloud computing configuration.

Non-transitory memory 806 may store the pre-processing module 808, the landmark detection module 810, and the multiplanar reformation (MPR) module 812.

The pre-processing module 808 may include instructions for identifying and isolating one or more anatomical regions of interest, along with instructions for dividing bilaterally symmetrical anatomical regions of interest, and performing other image processing operations. In one example, the pre-processing module 808 may include a machine learning (ML) model trained to map classify 2D medical images a containing, or belonging to, an anatomical region of interest. In some embodiments, the pre-processing module 808 may include instructions for selecting a sub-volume of interest from a 3D medical image volume. This selection may be based on identifying a subset of the plurality of 2D images that include the anatomical region of interest. The selected subset of 2D images may then be cropped to remove non-anatomical regions, thereby focusing on the relevant anatomical features. In certain embodiments, the 3D image volume may include symmetrical anatomical features. In such cases, the pre-processing module 808 may be configured to identify a pair of symmetrical anatomical features and select a sub-volume containing one of the anatomical features for further processing. This can be particularly useful in cases where the anatomical features of interest are bilaterally symmetrical, such as the lungs or kidneys. The pre-processing module 808 may also include a laterality separator step to separate left and right anatomical structures for separate processing. This can be beneficial in situations where the anatomical structures on one side of the body are of more interest or are more relevant to the medical diagnosis or treatment plan than those on the other side. In addition, the pre-processing module 808 may validate if the acquired 3D image volume is suitable for alignment before proceeding with further preprocessing. This validation may involve checking the quality of the 3D image volume, such as image resolution and signal-to-noise ratio, to ensure it meets the requirements for the subsequent image alignment process. In some embodiments, the pre-processing module 808 may include a machine learning model trained to classify 2D medical images as containing, or belonging to, an anatomical region of interest. This model may be used to assist in the selection of the sub-volume of interest from the 3D medical image volume. The model may be trained using a variety of machine learning techniques.

Non-transitory memory 806 may further store a landmark detection module 810, which may comprise instructions detecting a plurality of anatomical landmarks in the sub-volume of interest using a deep neural network trained to identify anatomical landmarks. The landmark detection module 810 may include a feature extraction component that is configured to extract features from the sub-volume of interest. These features may be used to identify potential anatomical landmarks within the sub-volume of interest. In some embodiments, the landmark detection module 810 may include a landmark classification component that is configured to classify anatomical landmarks based on the extracted features. The landmark classification component may use a machine learning model, such as a deep neural network, that has been trained to classify anatomical landmarks based on their features. In certain embodiments, the landmark detection module 810 may include a landmark encoding component that is configured to encode the classified anatomical landmarks as feature vectors. The landmark encoding component may compare the feature vectors against a distribution of previously encoded feature vectors of the same landmark type to determine a probability of the landmark belonging to the distribution of previously encoded feature vectors. The confidence in the landmark may be determined based on the probability. These features may include, but are not limited to, the position of the landmark within the sub-volume of interest, the intensity of the landmark, the shape of the landmark, and the texture of the landmark. The extracted features may then be encoded as a feature vector for each landmark. In another embodiment, the landmark detection module 810 may include a feature normalization component that normalizes the extracted features before they are encoded as a feature vector. The feature normalization component may use various normalization techniques, such as min-max normalization, z-score normalization, or decimal scaling normalization, to ensure that the features have a similar scale. This can help to prevent features with larger scales from dominating the encoding process. In yet another embodiment, the landmark detection module 810 may include a feature selection component that selects a subset of the extracted features for encoding. The feature selection component may use various feature selection techniques, such as mutual information, chi-square test, or recursive feature elimination, to select the most informative features for encoding.

In a further embodiment, the landmark detection module 810 may include a feature encoding component that uses a machine learning model, such as an autoencoder, to encode the selected features as a feature vector. The autoencoder may be trained to minimize the reconstruction error between the input features and the reconstructed features, resulting in a feature vector that captures the most important information about the landmark. In another embodiment, the landmark detection module 810 may include a feature comparison component that compares the encoded feature vector against a distribution of previously encoded feature vectors of the same landmark type. The feature comparison component may use various distance measures, such as Euclidean distance, Manhattan distance, or cosine similarity, to determine the similarity between the encoded feature vector and the distribution of previously encoded feature vectors. The confidence in the landmark may be determined based on this similarity.

Non-transitory memory 806 also stores MPR module 812, which may include instructions for executing one or more MPR algorithms known in the art of medical imaging, and may include resampling of image data from an image sequence along a landmark plane or other plane of interest to synthesize a view of the anatomy of interest in the desired orientation. The MPR module 812 may further include instructions for estimating transformation parameters based on detected anatomical landmarks. These transformation parameters may include rotation angles and translation vectors that are used to adjust the orientation and position of the sub-volume of interest. The MPR module 812 may be configured to apply these transformation parameters to the sub-volume of interest to produce a first aligned sub-volume of interest. In some embodiments, the MPR module 812 may include instructions for determining an anatomical plane of interest with respect to an image coordinate system based on a subset of landmarks detected by landmark detection module 810. This subset of landmarks may include at least three landmarks detected in the sub-volume of interest. The MPR module 812 may then perform multiplanar reformation of the sub-volume of interest along the anatomical plane of interest based on one or more geometric constraints imposed on the subset of landmarks.

Non-transitory memory 806 further stores geometric constraint module 814, which may include instructions for determining if positions of one or more landmarks detected by landmark detection module 810 satisfy one or more pre-determined geometric constraints, wherein the one or more geometric constraints may be stored within geometric constraint module 814, such as in a database. The geometric constraint module 814 may include instructions for determining the relative positions of landmarks with respect to each other. For instance, one landmark may be required to be located above another landmark, or one landmark may be required to be located to the right of another landmark. The geometric constraints may also include distances between pairs of landmarks with respect to one or more axes of the image coordinate system. For example, the difference between the y-coordinates of two landmarks may be constrained to be zero or within a threshold value. Additionally, the geometric constraint module 814 may include instructions for determining angles between lines connecting pairs of landmarks with respect to one or more axes of the image coordinate system. For example, the angle between a line connecting two landmarks and a point on the x-axis may be constrained to be 90 degrees or within a threshold value of 90 degrees.

The geometric constraint module 814 may also include instructions for determining the degree of satisfaction of the geometric constraints by the landmarks. This provides an indication of the accuracy of the alignment process. A higher degree of satisfaction corresponds to a higher confidence in the alignment. Furthermore, the geometric constraint module 814 may include instructions for determining the geometric constraint confidence based on the degree of geometric constraint satisfaction. It may be a function of the degree of satisfaction, where a higher degree of satisfaction corresponds to a higher confidence. The geometric constraint confidence may be normalized to a range between a minimum confidence value and a maximum confidence value. For example, it may be normalized to a range between 0 and 1, where 0 represents no confidence and 1 represents full confidence. The geometric constraint module 814 may also include instructions for adjusting the geometric constraint confidence based on additional factors such as the quality of the 3D image volume, the complexity of the anatomical region of interest, or the performance of the deep neural network in detecting the landmarks.

Non-transitory memory also stores a confidence estimation module 816, which may include instructions for determining confidence in one or more landmarks detected by landmark detection module 810, as well as instructions for determining confidence in transformation parameters based on a sub-volume aligned via said transformation parameters. The confidence estimation module 816 may include instructions for determining confidence in the transformation parameters based on the degree of satisfaction of geometric constraints by the landmarks in the aligned sub-volume. This confidence determination process may involve comparing the positions of the landmarks in the aligned sub-volume to one or more pre-determined geometric constraints stored within the geometric constraint module 814. The degree of satisfaction of these geometric constraints provides an indication of the accuracy of the alignment process. The geometric constraint satisfaction based confidence quantifies the level of confidence in the alignment based on the satisfaction of the geometric constraints. Furthermore, the confidence estimation module 816 may include instructions for projecting the aligned sub-volume onto a projection plane to produce a projection image. This projection image is then mapped to a projection confidence using a confidence estimation network. The projection confidence provides a quantitative measure of the accuracy of the alignment process based on the quality of the projection image. The confidence estimation module 816 may also include instructions for determining the overall confidence for the aligned sub-volume by combining the geometric constraint confidence with the projection confidence. This overall confidence provides a comprehensive measure of the accuracy of the alignment process, taking into account both the satisfaction of geometric constraints and the quality of the projection image.

In some embodiments, non-transitory memory 806 may include components disposed at two or more devices, which may be remotely located and/or configured for coordinated processing. In some embodiments, one or more aspects of non-transitory memory 806 may include remotely-accessible networked storage devices configured in a cloud computing configuration.

User input device 822 may comprise one or more of a touchscreen, a keyboard, a mouse, a trackpad, a motion sensing camera, or other device configured to enable a user to interact with and manipulate data within image processing system 802. In one example, user input device 822 may enable a user to make a selection of an anatomical region of interest for which a user wishes to view said anatomical region of interest one or more standard views.

Display device 824 may include one or more display devices utilizing virtually any type of technology. In some embodiments, display device 824 may comprise a computer monitor, and may display aligned medical image volumes, such as the automatically aligned image volumes produced according to one or more of the methods disclosed herein. Display device 824 may be combined with processor 804, non-transitory memory 806, and/or user input device 822 in a shared enclosure, or may be peripheral display devices and may comprise a monitor, touchscreen, projector, or other display device known in the art, which may enable a user to view MRIs produced by an MRI system, and/or interact with various data stored in non-transitory memory 806.

It should be understood that imaging system 800 shown in FIG. 8 is for illustration, not for limitation. Another appropriate imaging system may include more, fewer, or different components.

The disclosure also provides support for a method for automatic image alignment of a three-dimensional (3D) medical image volume, comprising: pre-processing the 3D medical image volume by selecting a sub-volume of interest, detecting a plurality of anatomical landmarks in the sub-volume of interest using a deep neural network trained to identify anatomical landmarks, estimating transformation parameters based on the plurality of anatomical landmarks to adjust rotation angles and translation of the sub-volume of interest, adjusting rotation angles and translation of the sub-volume of interest using the transformation parameters to produce a first aligned sub-volume of interest, determining confidence in the transformation parameters based on the first aligned sub-volume of interest, and refining the transformation parameters iteratively if the confidence is below a predetermined threshold. In a first example of the method, the 3D medical image volume is an image sequence comprising a plurality of two-dimensional (2D) images, and wherein pre-processing the 3D medical image volume by selecting the sub-volume of interest comprises: selecting a subset of the plurality of 2D images including the sub-volume of interest, and cropping the subset of the plurality of 2D images to remove regions outside the sub-volume of interest. In a second example of the method, optionally including the first example, selecting the sub-volume of interest comprises: identifying a pair of bilaterally symmetrical anatomical features in the 3D medical image volume, wherein the pair of bilaterally symmetrical anatomical features comprise a first anatomical feature and a second anatomical feature, and selecting the sub-volume containing the first anatomical feature, and not containing the second anatomical feature. In a third example of the method, optionally including one or both of the first and second examples, the plurality of anatomical landmarks comprises at least three distinct landmarks. In a fourth example of the method, optionally including one or more or each of the first through third examples, estimating transformation parameters based on the plurality of anatomical landmarks to adjust rotation angles and translation of the sub-volume of interest comprises: selecting a subset of landmarks from the plurality of anatomical landmarks detected in the sub-volume of interest, wherein the subset of landmarks include at least three landmarks, and determining an anatomical plane of interest with respect to an image coordinate system based on the subset of landmarks. In a fifth example of the method, optionally including one or more or each of the first through fourth examples, adjusting rotation angles and translation of the sub-volume of interest using the transformation parameters to produce the first aligned sub-volume of interest includes, performing multiplanar reformation of the sub-volume of interest along the anatomical plane of interest based on one or more geometric constraints imposed on the subset of landmarks. In a sixth example of the method, optionally including one or more or each of the first through fifth examples, determining confidence in the transformation parameters based on the first aligned sub-volume of interest comprises: detecting the plurality of anatomical landmarks in the first aligned sub-volume of interest using the deep neural network, comparing positions of the plurality of anatomical landmarks in the first aligned sub-volume of interest to one or more pre-determined geometric constraints to determine a degree of geometric constraint satisfaction, and determining the confidence in the transformation parameters based on the degree of geometric constraint satisfaction. In a seventh example of the method, optionally including one or more or each of the first through sixth examples, the transformation parameters include rotation angles and translation vectors. In a eighth example of the method, optionally including one or more or each of the first through seventh examples, refining the transformation parameters iteratively includes: detecting the plurality of anatomical landmarks in the first aligned sub-volume of interest using the deep neural network, estimating refined transformation parameters based on the plurality of anatomical landmarks to adjust rotation angles and translation of the first aligned sub-volume of interest, adjusting rotation angles and translation of the first aligned sub-volume of interest using the refined transformation parameters to produce a second aligned sub-volume of interest, determining confidence in the refined transformation parameters based on the second aligned sub-volume of interest, and further refining the refined transformation parameters iteratively if the confidence is below the predetermined threshold. In a ninth example of the method, optionally including one or more or each of the first through eighth examples the method further comprising: determining confidence in the refined transformation parameters based on the second aligned sub-volume of interest by: projecting the second aligned sub-volume of interest onto a plurality of projection planes to produce a plurality of projection images, and mapping the plurality of projection images to a corresponding plurality of confidence scores using a confidence estimation network, and determining confidence in the refined transformation parameters through majority voting using the plurality of confidence scores corresponding to the plurality of projection images.

The disclosure also provides support for an image processing system, comprising: a display device, a non-transitory memory including instructions, and a processor, wherein, when executing the instructions, the processor causes the image processing system to: receive a three-dimensional (3D) image volume, pre-process the 3D image volume by selecting a sub-volume of interest, detect a plurality of landmarks in the sub-volume of interest using a deep neural network trained to identify anatomical landmarks, estimate transformation parameters based on the plurality of landmarks to adjust rotation angles and translation of the sub-volume of interest, adjust rotation angles and translation of the sub-volume of interest using the transformation parameters to produce a first aligned sub-volume of interest, determine confidence in the transformation parameters based on the first aligned sub-volume of interest, and refine the transformation parameters iteratively if the confidence is below a predetermined threshold. In a first example of the system, the plurality of landmarks comprises at least three distinct landmarks. In a second example of the system, optionally including the first example, the processor further causes the image processing system to: select a subset of landmarks from the plurality of landmarks detected in the sub-volume of interest, wherein the subset of landmarks includes at least three landmarks, and determine an anatomical plane of interest with respect to an image coordinate system based on the subset of landmarks. In a third example of the system, optionally including one or both of the first and second examples, the processor further causes the image processing system to: perform multiplanar reformation of the sub-volume of interest along the anatomical plane of interest. In a fourth example of the system, optionally including one or more or each of the first through third examples, the processor further causes the image processing system to: detect the plurality of landmarks in the first aligned sub-volume of interest using the deep neural network, compare positions of the plurality of landmarks in the first aligned sub-volume of interest to one or more pre-determined geometric constraints to determine a degree of geometric constraint satisfaction, and determine the confidence in the transformation parameters based on the degree of geometric constraint satisfaction. In a fifth example of the system, optionally including one or more or each of the first through fourth examples, the processor further causes the image processing system to: project the first aligned sub-volume of interest onto a projection plane to produce a projection image, wherein the projection plane is parallel to a plurality of 2D images comprising the first aligned sub-volume of interest, and map the projection image to a confidence score using a confidence estimation network.

The disclosure also provides support for a method comprising: receiving a three-dimensional (3D) image volume comprising a first plurality of two-dimensional (2D) images parallel to a first plane, pre-processing the 3D image volume by selecting a subset of the first plurality of 2D images to produce a sub-volume of interest including an anatomical region of interest, detecting at least three landmarks in the sub-volume of interest using a deep neural network trained to identify anatomical landmarks, estimating transformation parameters, including an anatomical plane of interest intersecting the sub-volume of interest, based on the at least three landmarks, performing multiplanar reformatting of the sub-volume of interest along the anatomical plane of interest to produce a first aligned sub-volume of interest, wherein the first aligned sub-volume of interest comprises a second plurality of 2D images parallel to the anatomical plane of interest, determining confidence in the transformation parameters based on the first aligned sub-volume of interest, and refining the transformation parameters iteratively if the confidence is below a predetermined threshold. In a first example of the method, detecting the at least three landmarks includes: detecting a plurality of landmarks comprising more than three landmarks in the sub-volume of interest, for each landmark of the plurality of landmarks: encoding the landmark as a feature vector, and comparing the feature vector against a distribution of previously encoded feature vectors of a same landmark type as the landmark, determining a probability of the landmark belonging to the distribution of previously encoded feature vectors, and determining a confidence in the landmark based on the probability. In a second example of the method, optionally including the first example the method further comprising, filtering the plurality of landmarks based on confidence, to obtain the at least three landmarks. In a third example of the method, optionally including one or both of the first and second examples, determining confidence in the transformation parameters based on the first aligned sub-volume of interest comprises: detecting the at least three landmarks in the first aligned sub-volume of interest using the deep neural network, comparing positions of the at least three landmarks in the first aligned sub-volume of interest to one or more pre-determined geometric constraints, to determine a degree of geometric constraint satisfaction determining a geometric constraint confidence based on the degree of geometric constraint satisfaction, projecting the first aligned sub-volume of interest onto a projection plane to produce a projection image, mapping the projection image to a projection confidence using a confidence estimation network, and determining an overall confidence for the first aligned sub-volume by combining the geometric constraint confidence with the projection confidence.

As used herein, an element or step recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for automatic image alignment of a three-dimensional (3D) medical image volume, an imaging modality of the 3D medical image volume including at least one of computed tomography (CT), magnetic resonance imaging (MRI), and ultrasound, the method comprising:

pre-processing the 3D medical image volume by selecting a sub-volume of interest;

detecting a plurality of anatomical landmarks in the sub-volume of interest using a deep neural network trained to identify anatomical landmarks;

estimating transformation parameters based on the plurality of anatomical landmarks to adjust rotation angles and translation of the sub-volume of interest;

adjusting rotation angles and translation of the sub-volume of interest using the transformation parameters to produce a first aligned sub-volume of interest;

determining confidence in the transformation parameters based on the first aligned sub-volume of interest;

refining the transformation parameters iteratively if the confidence is below a predetermined threshold;

adjusting rotation angles and translation of the first aligned sub-volume of interest using the refined transformation parameters to produce a second aligned sub-volume of interest;

determining confidence in the refined transformation parameters based on the second aligned sub-volume of interest by:

projecting the second aligned sub-volume of interest onto a plurality of projection planes to produce a plurality of projection images; and mapping the plurality of projection images to a corresponding plurality of confidence scores using a confidence estimation network; and determining confidence in the refined transformation parameters through majority voting using the plurality of confidence scores corresponding to the plurality of projection images.

2. The method of claim 1, wherein the 3D medical image volume is an image sequence comprising a plurality of two-dimensional (2D) images, and wherein pre-processing the 3D medical image volume by selecting the sub-volume of interest comprises:

selecting a subset of the plurality of 2D images including the sub-volume of interest; and cropping the subset of the plurality of 2D images to remove regions outside the sub-volume of interest.

3. The method of claim 1, wherein selecting the sub-volume of interest comprises:

identifying a pair of bilaterally symmetrical anatomical features in the 3D medical image volume, wherein the pair of bilaterally symmetrical anatomical features comprise a first anatomical feature and a second anatomical feature; and selecting the sub-volume containing the first anatomical feature, and not containing the second anatomical feature.

4. The method of claim 1, wherein the plurality of anatomical landmarks comprises at least three distinct landmarks.

5. The method of claim 1, wherein estimating transformation parameters based on the plurality of anatomical landmarks to adjust rotation angles and translation of the sub-volume of interest comprises:

selecting a subset of landmarks from the plurality of anatomical landmarks detected in the sub-volume of interest, wherein the subset of landmarks include at least three landmarks; and determining an anatomical plane of interest with respect to an image coordinate system based on the subset of landmarks.

6. The method of claim 5, wherein adjusting rotation angles and translation of the sub-volume of interest using the transformation parameters to produce the first aligned sub-volume of interest includes, performing multiplanar reformation of the sub-volume of interest along the anatomical plane of interest based on one or more geometric constraints imposed on the subset of landmarks.

7. The method of claim 1, wherein determining confidence in the transformation parameters based on the first aligned sub-volume of interest comprises:

detecting the plurality of anatomical landmarks in the first aligned sub-volume of interest using the deep neural network;

comparing positions of the plurality of anatomical landmarks in the first aligned sub-volume of interest to one or more pre-determined geometric constraints to determine a degree of geometric constraint satisfaction; and determining the confidence in the transformation parameters based on the degree of geometric constraint satisfaction.

8. The method of claim 1, wherein the transformation parameters include rotation angles and translation vectors.

9. The method of claim 1, wherein refining the transformation parameters iteratively includes:

detecting the plurality of anatomical landmarks in the first aligned sub-volume of interest using the deep neural network;

estimating refined transformation parameters based on the plurality of anatomical landmarks to adjust rotation angles and translation of the first aligned sub-volume of interest;

determining confidence in the refined transformation parameters based on the second aligned sub-volume of interest; and further refining the refined transformation parameters iteratively if the confidence is below the predetermined threshold.

10. An image processing system, comprising:

a display device;

a non-transitory memory including instructions; and a processor, wherein, when executing the instructions, the processor causes the image processing system to:

receive a three-dimensional (3D) image volume, an imaging modality of the 3D image volume including at least one of computed tomography (CT), magnetic resonance imaging (MRI), and ultrasound;

pre-process the 3D image volume by selecting a sub-volume of interest;

detect a plurality of landmarks in the sub-volume of interest using a deep neural network trained to identify anatomical landmarks;

estimate transformation parameters based on the plurality of landmarks to adjust rotation angles and translation of the sub-volume of interest;

adjust rotation angles and translation of the sub-volume of interest using the transformation parameters to produce a first aligned sub-volume of interest;

determine confidence in the transformation parameters based on the first aligned sub-volume of interest;

refine the transformation parameters iteratively if the confidence is below a predetermined threshold;

adjusting rotation angles and translation of the first aligned sub-volume of interest using the refined transformation parameters to produce a second aligned sub-volume of interest;

determining confidence in the refined transformation parameters based on the second aligned sub-volume of interest by:

projecting the second aligned sub-volume of interest onto a plurality of projection planes to produce a plurality of projection images; and mapping the plurality of projection images to a corresponding plurality of confidence scores using a confidence estimation network; and determining confidence in the refined transformation parameters through majority voting using the plurality of confidence scores corresponding to the plurality of projection images.

11. The image processing system of claim 10, wherein the plurality of landmarks comprises at least three distinct landmarks.

12. The image processing system of claim 10, wherein the processor further causes the image processing system to:

select a subset of landmarks from the plurality of landmarks detected in the sub-volume of interest, wherein the subset of landmarks includes at least three landmarks; and determine an anatomical plane of interest with respect to an image coordinate system based on the subset of landmarks.

13. The image processing system of claim 12, wherein the processor further causes the image processing system to:

perform multiplanar reformation of the sub-volume of interest along the anatomical plane of interest.

14. The image processing system according to claim 10, wherein the processor further causes the image processing system to:

detect the plurality of landmarks in the first aligned sub-volume of interest using the deep neural network;

compare positions of the plurality of landmarks in the first aligned sub-volume of interest to one or more pre-determined geometric constraints to determine a degree of geometric constraint satisfaction; and determine the confidence in the transformation parameters based on the degree of geometric constraint satisfaction.

15. The image processing system of claim 10, wherein the processor further causes the image processing system to:

project the first aligned sub-volume of interest onto a projection plane to produce a projection image, wherein the projection plane is parallel to a plurality of 2D images comprising the first aligned sub-volume of interest; and map the projection image to a confidence score using a confidence estimation network.

33                                                                                    34

16. A method comprising:

receiving a three-dimensional (3D) image volume comprising a first plurality of two-dimensional (2D) images parallel to a first plane, an imaging modality of the 3D image volume including at least one of computed tomography (CT), magnetic resonance imaging (MRI), and ultrasound;

pre-processing the 3D image volume by selecting a subset of the first plurality of 2D images to produce a sub-volume of interest including an anatomical region of interest;

detecting at least three landmarks in the sub-volume of interest using a deep neural network trained to identify anatomical landmarks;

estimating transformation parameters, including an anatomical plane of interest intersecting the sub-volume of interest, based on the at least three landmarks;

performing multiplanar reformatting of the sub-volume of interest along the anatomical plane of interest to produce a first aligned sub-volume of interest, wherein the first aligned sub-volume of interest comprises a second plurality of 2D images parallel to the anatomical plane of interest;

determining confidence in the transformation parameters based on the first aligned sub-volume of interest;

refining the transformation parameters iteratively if the confidence is below a predetermined threshold;

adjusting rotation angles and translation of the first aligned sub-volume of interest using the refined transformation parameters to produce a second aligned sub-volume of interest;

determining confidence in the refined transformation parameters based on the second aligned sub-volume of interest by:

projecting the second aligned sub-volume of interest onto a plurality of projection planes to produce a plurality of projection images; and mapping the plurality of projection images to a corresponding plurality of confidence scores using a confidence estimation network; and determining confidence in the refined transformation parameters through majority voting using the plurality of confidence scores corresponding to the plurality of projection images.

17. The method of claim 16, wherein detecting the at least three landmarks includes:

detecting a plurality of landmarks comprising more than three landmarks in the sub-volume of interest;

for each landmark of the plurality of landmarks:

encoding the landmark as a feature vector; and comparing the feature vector against a distribution of previously encoded feature vectors of a same landmark type as the landmark;

determining a probability of the landmark belonging to the distribution of previously encoded feature vectors; and determining a confidence in the landmark based on the probability.

18. The method of claim 17, the method further comprising, filtering the plurality of landmarks based on confidence, to obtain the at least three landmarks.

19. The method of claim 16, wherein determining confidence in the transformation parameters based on the first aligned sub-volume of interest comprises:

detecting the at least three landmarks in the first aligned sub-volume of interest using the deep neural network;

comparing positions of the at least three landmarks in the first aligned sub-volume of interest to one or more pre-determined geometric constraints, to determine a degree of geometric constraint satisfaction determining a geometric constraint confidence based on the degree of geometric constraint satisfaction;

projecting the first aligned sub-volume of interest onto a projection plane to produce a projection image;

mapping the projection image to a projection confidence using a confidence estimation network; and determining an overall confidence for the first aligned sub-volume by combining the geometric constraint confidence with the projection confidence.

\*    \*    \*    \*    \*